United States Patent
Nishi et al.

(10) Patent No.: US 7,619,959 B2
(45) Date of Patent: Nov. 17, 2009

(54) OPTICAL HEAD, OPTICAL RECORDING MEDIUM RECORDING AND/OR REPRODUCING APPARATUS AND RECORDING AND/OR REPRODUCING METHOD USING THE OPTICAL HEAD

(75) Inventors: Noriaki Nishi, Tokyo (JP); Masaru Tezuka, Kanagawa (JP); Naoki Inoue, Kanagawa (JP); Kunika Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1167 days.

(21) Appl. No.: 10/498,008

(22) PCT Filed: Dec. 18, 2002

(86) PCT No.: PCT/JP02/13259

§ 371 (c)(1),
(2), (4) Date: Jan. 18, 2005

(87) PCT Pub. No.: WO03/056552

PCT Pub. Date: Jul. 10, 2003

(65) Prior Publication Data
US 2005/0117494 A1 Jun. 2, 2005

(30) Foreign Application Priority Data
Dec. 27, 2001 (JP) ............................. 2001-397679

(51) Int. Cl.
G11B 7/00 (2006.01)

(52) U.S. Cl. ............................. 369/112.02; 369/112.01; 369/112.22; 369/44.23; 369/47.5

(58) Field of Classification Search ................... None
See application file for complete search history.

(56) References Cited

U.S. PATENT DOCUMENTS 6,061,317 A * 5/2000 Shodo ..................... 369/53.26

(Continued)

FOREIGN PATENT DOCUMENTS

EP    1 461 806 A1    9/2004

(Continued)

*Primary Examiner*—Muhammad N. Edun
(74) *Attorney, Agent, or Firm*—Oblon, Spivak, McClelland, Maier & Neustadt, L.L.P.

(57) ABSTRACT

An optical disk drive (101) for optically recording and/or reproducing information signals is provided in which the power of a light beam emitted from an optical head (104) to an optical disk (102) is controlled by an optical-coupling efficiency varying elements (214, 215) correspondingly to the type of the optical disk, recording layer in a multilayer optical disk and a mode of operation selected while a variation of the optical-coupling efficiency is being detected by a light-detecting element (216), thereby positively varying the optical-coupling efficiency in a minimum necessary time. Thus, the power of the light beam focused on the optical disk can be varied in a wide range without having to extremely raise the ratio in output power between modes of operation at a light source (212). Therefore, even a light source whose rating of optical output power is small can be used to write and read information signals to and from any of optical disks of different types or to each of recording layers in a multilayer optical disk with a high accuracy. Namely, good characteristics in writing and reading information signals can be assured without having to largely vary the ratio in output power of the light source from the write to read mode, from one to another type of optical disks or from one to another recording layer of the multilayer optical disk.

5 Claims, 17 Drawing Sheets

U.S. PATENT DOCUMENTS 6,847,592 B2 * 1/2005 Okumura et al. ......... 369/13.54

FOREIGN PATENT DOCUMENTS

| | | |
|---|---|---|
| JP | 60-237648 | 11/1985 |
| JP | 62-113419 | 7/1987 |
| JP | 1-166344 | 6/1989 |
| JP | 1-303640 | 12/1989 |
| JP | 2-96622 | 8/1990 |
| JP | 4-255925 | 9/1992 |
| JP | 4-263147 | 9/1992 |
| JP | 6-28700 | 2/1994 |
| JP | 6-131683 | 5/1994 |
| JP | 7-262590 | 10/1995 |
| JP | 8-17065 | 1/1996 |
| JP | 9-27141 | 1/1997 |
| JP | 10-320811 | 12/1998 |
| JP | 11-232651 | 8/1999 |
| JP | 2000-36130 | 2/2000 |
| JP | 2000-36152 | 2/2000 |
| JP | 2000-195086 | 7/2000 |
| WO | WO 03/049096 A1 | 6/2003 |

* cited by examiner

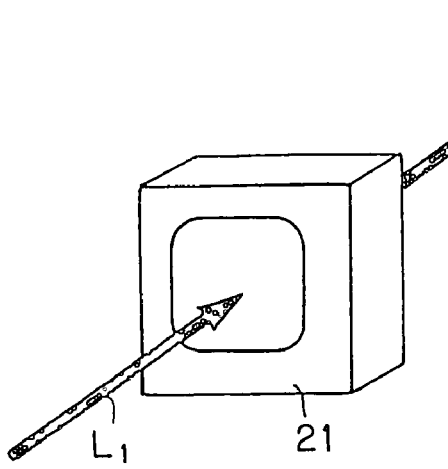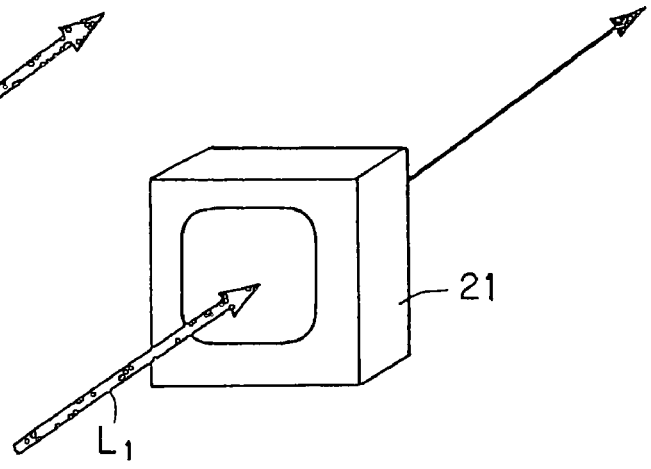
FIG.15A  FIG.15B
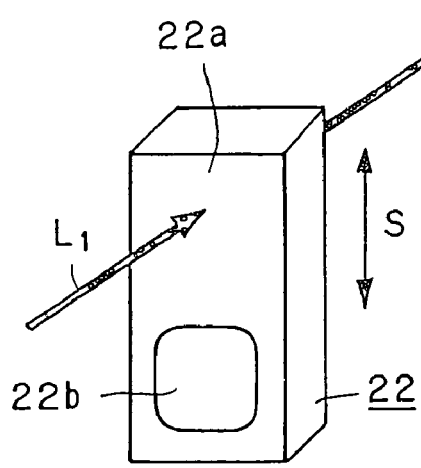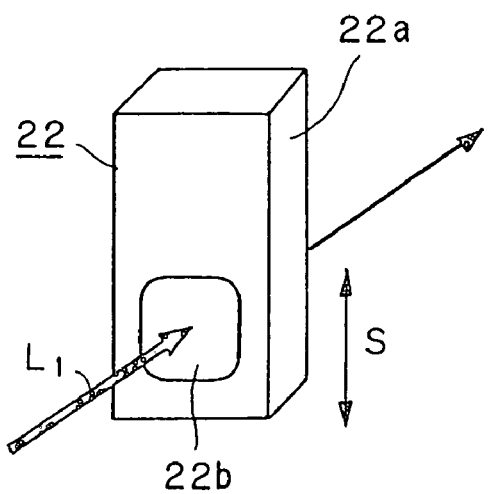
FIG.16A  FIG.16B

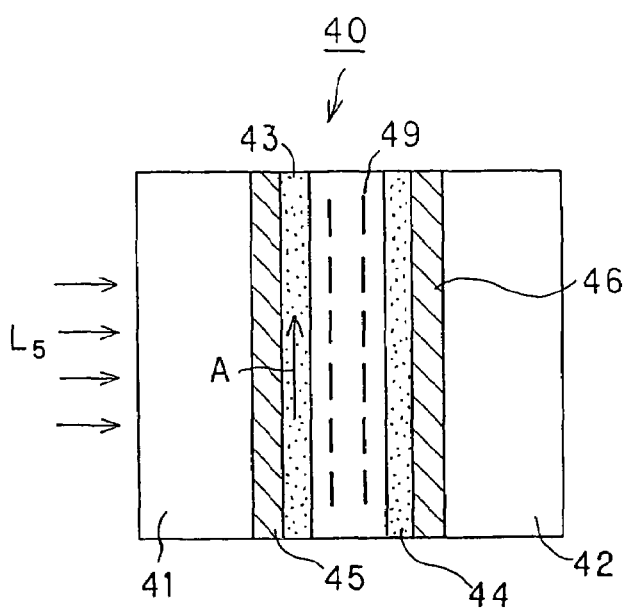
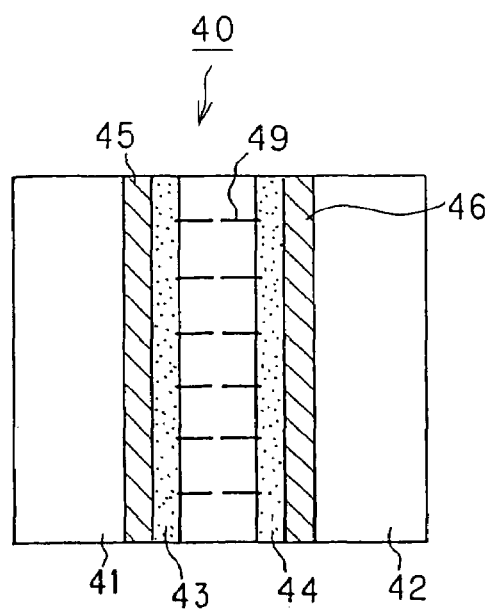
FIG. 19A  FIG. 19B
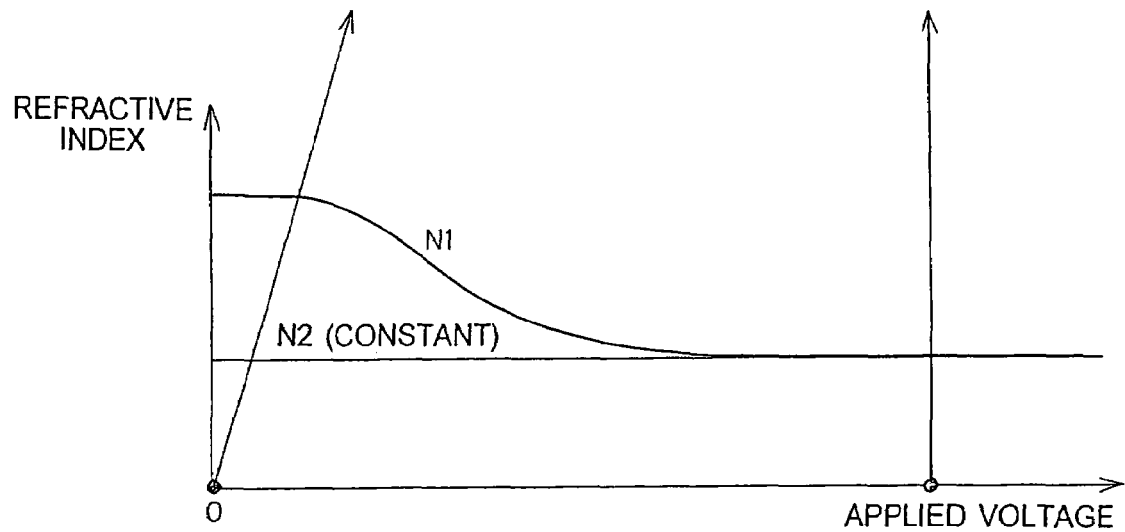
FIG. 19C
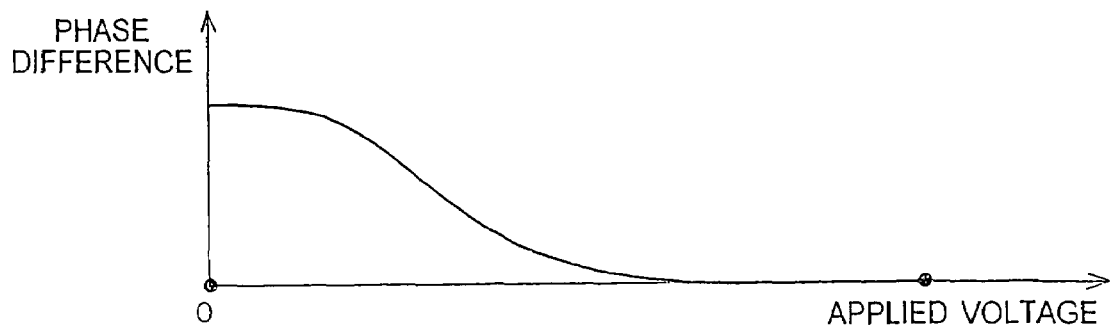
FIG. 19D

OPTICAL HEAD, OPTICAL RECORDING MEDIUM RECORDING AND/OR REPRODUCING APPARATUS AND RECORDING AND/OR REPRODUCING METHOD USING THE OPTICAL HEAD

TECHNICAL FIELD

The present invention relates to a recording and/or playback apparatus and method, for writing and/or reading various information signals to and/or from an optical recording medium such as an optical disk or the like.

This application claims the priority of the Japanese Patent Application No. 2001-397679 filed on Dec. 27, 2001, the entirety of which is incorporated by reference herein.

BACKGROUND ART

There have so far been proposed optical recording media, typically optical disks, including those of read-only type having information signals prerecorded therein by a pattern of pits which are microscopic holes, those having a phase-change layer to which information signals can be written, and those having a magneto-optical recording layer to which information signals can be recorded. Generally in an optical recording medium recording and/or playback apparatus that uses, as a recording medium, a recordable one among such types of optical recording media, namely, in an optical disk drive, there is provided a semiconductor laser that is relatively large in maximum optical output power rating. It should be noted that an optical disk drive designed to play only a read-only optical disk as a recording medium needs a light source not as large in maximum output rating as that of an optical disk drive which uses a recordable optical disk but which can emit a greater amount of light than a certain value.

The reason for the above will be described below:

Generally, the semiconductor laser whose output is small cannot easily provide any stable light emission and the laser noise will be larger. Therefore, to assure a CNR (carrier-to-noise ratio) of information signals when the latter are recorded in an optical disk, the optical output power of the semiconductor laser has to be set to a large level than a certain value (normally, 2 to 5 mW).

On the other hand, in case information signals are recorded to an optical recording medium to which the signals can be recorded, a light beam is focused on the recording surface of an optical recording layer of the medium to a higher temperature than predetermined. In this case, the power of a light beam from a semiconductor laser for reading the information signals from the medium should be large enough to assure an ample CNR of the read information signals, and also that for recording information signals to the medium should be large enough to assure heating of the recording layer to the temperature higher than predetermined and a stable recording of the information signals. Normally, the maximum power of writing light used for writing information signals to an optical recording medium is about 5 to 20 times larger than that of reading light. Further, for recording information signals at a higher speed than a standard one, the semiconductor laser has to provide a larger optical output power.

For the above reason, the maximum rating of optical output power of a light source used in an optical head that makes both write and read of information signals to and from an optical recording medium, or of a light source used in an optical head that writes and reads information signals to multiple types of optical recording media, is normally about 20 to 50 mW. An optical head used in an optical disk drive that rotates an optical disk at a velocity about eight times higher than a standard velocity of rotation to write information signals to the optical disk employs a light source that provides an optical output power of about 100 mW.

A light source having a large maximum rating of optical output power is difficult to implement and it will consume much power. However, in case the maximum rating of optical output power is reduced with the difficulty and great power consumption taken in consideration, a large laser noise will take place during playback of an optical disk, which will lead to a poor characteristic of reading.

On the other hand, the read-only optical disk such as DVD (digital versatile disk) has two recording layers. Also, there has been proposed an optical disk capable of recording information signals, namely, a recordable disk, and which has two or four recording layers. Write or read of information signals to or from each of the plurality of recording layers of the optical disk needs a writing- or reading optical power more than about 1.5 to 2 times larger than write or read to or from a single recording layer.

Thus, in an optical disk drive which can selectively play a single-layer optical disk and multilayer one, the ratio between the maximum optical power for writing information signals to the multilayer optical disk and read optical power for reading information signals from the single-layer optical disk will be more than two times larger than that in an optical disk drive designed to play a single-layer optical disk.

Further, if the linear velocity at which a light beam scans a recording track is different from one type to another of an optical disk being played, the optical powers necessary for write and read of information signals also are different correspondingly. That is, as the linear velocity at which a light beam scans a recording track on an optical disk is higher, the optical powers necessary for writing and reading information signals should be larger.

To assure a stable write or read of information signals to or from an optical recording medium designed to have a plurality of signal recording layers, or an optical recording medium designed to rotate at a higher velocity, both intended for an increased recording capacity and also to or from a conventional optical recording medium having a single recording layer, a light source included in an optical head should be able to provide an optical output power in a wider dynamic range.

DISCLOSURE OF THE INVENTION

Accordingly, the present invention has an object to overcome the above-mentioned drawbacks of the related art by providing an improved and novel optical head and an optical recording medium recording and/or playback apparatus using the optical head.

The present invention has another object to provide an optical head showing a good characteristic in reading information signals with a sufficient suppression of reading laser noise even with a small ratio in light source power between a write mode in which information signals are written to an optical recording medium and a read mode in which information signals are read from the optical recording medium, and a recording/playback apparatus and method, using the optical head.

The present invention has a still another object to provide an optical head showing good characteristics in writing and reading information signals to and from an optical recording medium even with a light source whose maximum rating of optical output power is small, and an optical recording/playback apparatus and method, using the optical head.

The present invention has a yet another object to provide an optical head showing good characteristics in writing and reading information signals, with a sufficient suppression of reading laser noise, to and from a recording medium, whichever the latter is one of multiple types of optical recording media different in optimum writing and reading optical powers of light beams from each other, an optical recording medium having multiple signal recording layers or an optical recording having a single recording layer divided in a plurality of recording areas, and an optical medium recording and/or playback apparatus and method, using the optical head.

The above object can be attained by providing an optical head including, according to the present invention, a light source; a light focusing means for focusing a light beams emitted from the light source onto an optical recording medium; a beam splitting means for making the light beam emitted from the light source and return light coming from the optical recording medium via the light focusing means travel along different light paths; a light detecting means for detecting the return light coming from the optical recording medium via the beams splitting means; and an optical-coupling efficiency varying means, and an optical-coupling efficiency detecting means, provided between the light source and beam splitting means. The optical-coupling efficiency varying means is to vary an optical-coupling efficiency that is a ratio of an amount of light focused on the optical recording medium with a total amount of light emitted from the light source, and the optical-coupling efficiency detecting means is to detect information corresponding to an optical-coupling efficiency varied by the optical-coupling efficiency varying means.

The above optical head according to the present invention can read information signals with a sufficient suppression of reading laser noise even with a small ratio in amount of light between the write and read modes, and also read, with a sufficient suppression of reading laser noise, information signals from an optical recording medium, whichever the latter is one of multiple types of optical recording media different in optimum writing and reading optical powers of light beams from each other, an optical recording medium having multiple signal recording layers or an optical recording having a single recording layer divided in a plurality of recording areas.

Also the above object can be attained by providing an optical recording medium recording and/or playback apparatus which writes or reads information signals to a selected one of at least two or more types of optical recording media different in optimum recording-optical power and/or reading optical power from each other, the apparatus including, according to the present invention, an optical head including a light source; and a light focusing means for focusing a light beams emitted from the light source onto an optical recording medium. The optical head includes a beam splitting means for making the light beam emitted from the light source and return light coming from the optical recording medium via the light focusing means travel along different light paths; a light detecting means for detecting the return light coming from the optical recording medium via the beams splitting means; and an optical-coupling efficiency varying means, and an optical-coupling efficiency detecting means, provided between the light source and beam splitting means. The optical-coupling efficiency varying means is to vary an optical-coupling efficiency that is a ratio of an amount of light focused on the optical recording medium with a total amount of light emitted from the light source, and the optical-coupling efficiency detecting means is to detect information corresponding to an optical-coupling efficiency varied by the optical-coupling efficiency varying means.

The above optical recording medium recording and/or playback apparatus according to the present invention can read information signals with a sufficient suppression of reading laser noise even with a small ratio in amount of light between the write and read modes, and also read, with a sufficient suppression of reading laser noise, information signals from an optical recording medium, whichever the latter is one of multiple types of optical recording media different in optimum powers of light beams used for writing and reading information signals from each other, an optical recording medium having multiple signal recording layers or an optical recording having a single recording layer divided in a plurality of recording areas.

Also the above object can be attained by providing an optical recording medium recording and/or playback method of writing and/or reading information signals to a selected one of at least two or more types of optical recording media different in optimum recording-optical power and/or reading optical power from each other, in which an optical-coupling efficiency, that is a ratio of an amount of light focused on the optical recording medium with a total amount of light emitted from the light source, is detected, and the optical-coupling efficiency is varied on the basis of the result of detection.

In the above optical recording medium recording and/or playback method according to the present invention, information signals can be read with a sufficient suppression of reading laser noise even with the ratio in amount of light between the write and read modes, and also information signals can be read, with a sufficient suppression of reading laser noise, from an optical recording medium, whichever the latter is one of multiple types of optical recording media different in optimum writing and reading optical powers of light beams from each other, an optical recording medium having multiple signal recording layers or an optical recording having a single recording layer divided in a plurality of recording areas.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 15A and 15B are perspective views of an illustrative example of a first type of the optical-coupling efficiency varying element used in the optical head used in the optical disk drive according to the present invention.

FIGS. 16A and 16B are perspective views of another illustrative example of the first type of the optical-coupling efficiency varying element used in the optical head used in the optical disk drive according to the present invention.

FIGS. 19A to 19D explain together the optical-coupling efficiency varying elements shown in FIGS. 18A and 18B, respectively, showing the configuration and function of a liquid crystal element forming each of the optical-coupling efficiency varying elements.

BEST MODE FOR CARRYING OUT THE INVENTION

The optical recording medium recording and/or playback apparatus according to the present invention will be described in detail concerning an optical disk drive using an optical disk as the recording medium with reference to the accompanying drawings.

Figure 1:
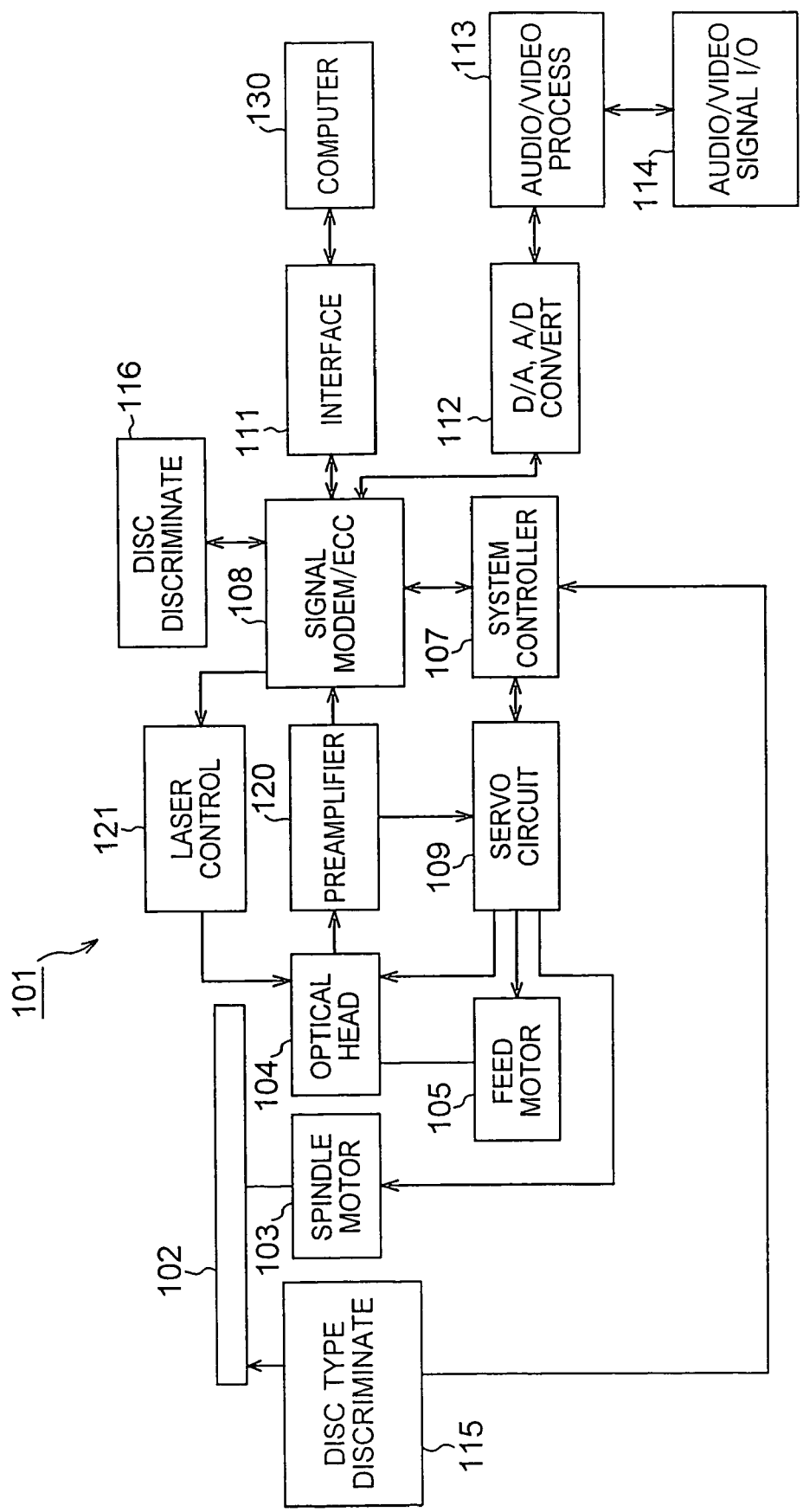
FIG. 1 is a block diagram of an optical disk drive using an optical head according to an embodiment of the present invention.

Referring now to FIG. 1, there is schematically illustrated in the form of a block diagram an optical disk drive according to an embodiment of the present invention. The optical disk drive is generally indicated with a reference 101. As shown, the optical disk drive 1 includes a spindle motor 103 included in a rotation drive mechanism that rotates an optical disk 102, an optical head 104, and a feed motor 105 that moves the optical head 104 radially of the optical disk 102 being rotated.

The spindle motor 103 is driven at a predetermined velocity under the control of a system controller 107 and servo circuit 109, forming together a disk type discriminating means for discriminating the type of the optical disk 102 loaded in the optical disk drive 101.

The optical disk 102 compatible with the optical disk drive 101 includes a recordable optical disk adopting the light-intensity modulation technique, such as CD-R/RW, DVD-RAM, DVD-R/RW or DVD+RW, or a magneto-optical disk adopting the magneto-optical recording technique.

According to the present invention, the optical disk drive 101 is configured to selectively use two or more types of optical disks different in optimum writing and reading optical power of light beams from each other, or to use an optical disk having a recording layer thereof divided in two or more recording areas different in optimum writing and reading optical powers from each other or an optical disk having a plurality of recording layers stacked one on the other.

The difference in optimum writing optical power or reading optical power of a light beam irradiated to the signal recording layer of the optical disk 102 may be that caused by a difference in recording method from one optical disk to another or difference in rotating velocity from one optical disk to another. The difference in rotating velocity between different types of optical disks is a speed of a light beam scanning the recording track on an optical disk in relation to the optical disk being rotated.

The optical disk 102 used in the optical disk drive 101 according to the present invention includes a multilayer optical disk having at least two or more recording layers different or equal in optimum writing and reading optical powers of light beams from or to each other. In case a multilayer optical disk is used in the optical disk drive 101, the recording layers formed in stack in the optical disk are different in optimum writing and reading optical powers from each other.

The light beam used to write or read information signals to or from each of the above-mentioned optical disks has a wavelength of about 400 to 780 nm.

The optical head 104 emits a light beam to the recording surface of the optical disk 102, and detects a return light from the recording surface. The optical head 104 detects the return light from the recording surface of the optical disk 102, and supplies a detection output of the detected return light to a preamplifier 120. The output of the preamplifier 120 is sent to a signal modem/ECC block 108. The signal modem/ECC block 108 modulates a signal, demodulates a modulated signal, and add an ECC (error correction code) to a signal. The optical head 104 irradiates a light beam to the recording surface of the optical disk 102 being rotated according to a command from the signal modem/ECC block 108. With this irradiation of a light beam, information signals are written to or read from the optical disk 102.

The above-mentioned preamplifier 120 generates a focus error signal, tracking error signal, RF signal, etc. on the basis of a signal corresponding to each light beam detected by the optical head 104. The servo circuit 109, signal modem/ECC block 108 and the like perform predetermined operations such as demodulation, error correction, etc. on the basis of the focus error signal, tracking error signal, RF signal, etc. correspondingly to the type of an optical disk used as a recording medium for information signals. When the optical disk 102 is intended for use to store data handled in information processing in a computer or the like, for example, recorded signals thus demodulated are sent to an information processor such as a computer 130 via an interface 111. Namely, data recorded on the optical disk 102 is supplied as read signals to the information processor such as a computer 130 having connected thereto the optical disk drive 101 according to the present invention.

In case the optical disk 102 loaded in the optical disk drive 101 is an audio/video disk that records audio data and video data, the data is converted from digital to analog by a D-A converter block of a D-A/A-D converter 112, and the analog data is supplied to an audio/video processor 113. The signals supplied to the audio/video processor 113 undergo audio/video processing therein, and transmitted to an external imaging device/cineprojector via an audio/video signal input/output unit 114.

The optical head 104 is moved by the feed motor 105 radially of the optical disk 102 to a position corresponding to a predetermined recording track on the optical disk 102. At this time, the servo circuit 109 controls the spindle motor 103, feed motor 105, and movement of a biaxial actuator that supports an objective lens in the optical head 104 in focusing and tracking directions.

The servo circuit 109 controls an optical-coupling efficiency varying element disposed inside the optical head 104 according to the present invention to vary the optical-coupling efficiency in the optical head 104, that is, a ratio of light amount focused on the optical disk 102 with a total amount of light beam emitted from the laser source, from the write to read mode of the optical disk drive 101.

The optical disk drive 101 also includes a laser controller 121 that controls a laser source included in the optical head 104. In particular, the laser controller 121 in this embodiment controls the output power of the laser source to be different from the write to read mode of the optical disk drive 101.

In case the optical disk 102 loaded in the optical disk drive 101 is any of two or more types of optical disks different, from each other, in optical writing optical power and reading optical power of a light beam focused on the signal recording layer, a disk type discrimination sensor 115 discriminates the type of the loaded optical disk 102. It should be noted that the optical disks 102 of different types include those different in recording medium from each other, those having a recording layer thereof divided in a plurality of recording areas, and those having a plurality of recording layers different in specification from each other. The optical disk 102 may be any of those adopting different recording methods each using the light-intensity modulation technique or various magneto-optical recording media. Such optical disks 102 include those different, from each other, in optimum writing or reading optical power of a light beam focused on the recording layer. The disk type discrimination sensor 115 detects the surface reflectivity of the loaded optical disk 102, differences in shape of the optical disk 102 from other types of optical disks, etc. to discriminate the type of the loaded optical disk 102. The detection signal from the disk type discrimination sensor 115 is supplied to the system controller 107.

To discriminate the type of an optical disk 102 loaded in the optical disk drive 101, in case the optical disk 102 is encased in a cartridge, a disk type discrimination-oriented detection hole may be formed in the cartridge. Identification information for type discrimination of an optical disk 102 may be recorded in an area for TOC (table of contents) information recorded by pre-mastered pits, grooves or the like and which is defined along the innermost circumference of the optical disk 102. In this area, there are recorded disk type information indicating the type of the optical disk 102 itself and information on recommended writing optical power and reading optical power of a light beam used to write or read information signals to or from the optical disk 102 itself. These information are detected from the optical disk 102, and used to control the optical head 104 to provide writing optical power or reading optical power suitable for writing or reading information signals to or from the optical disk 102.

The servo circuit 109 to control the optical-coupling efficiency is controlled by the system controller 107 to control the optical-coupling efficiency in the optical head 104 correspondingly to the type of the loaded optical disk 102 on the basis of the result of disk type discrimination from the disk type discrimination sensor 115.

In case the optical disk 102 used is an optical disk having a recording layer thereof divided in at least two or more recording areas different in optimum writing and reading optical powers from each other, a recording area discriminating means is used to detect an area to which information signals are to be written or an area from which information signals are to be read. In case a plurality of recording areas is defined concentrically with the center of the optical disk 102, the servo circuit 109 can be used as the recording area discriminating means. The servo circuit 109 can discriminate a recording area to or from which information signals are going to be written or read by detecting a physical relation between the optical head 104 and optical disk 102. It should be noted that the physical relation between the optical head 104 and optical disk 102 may be detected on the basis of an address signal recorded on the optical disk 102. The servo circuit 109 controls the optical-coupling efficiency in the optical head 104 on the basis of the result of discrimination of a recording area to or from which information signals are going to be written or read.

In case the optical disk 102 used in the optical disk drive 101 according to the present invention is a multilayer optical disk having at least two or more recording layers different in optimum writing and reading optical powers from each other, a recording layer discrimination means is used to discriminate a recording layer to which information signals are to be written or a recording layer from which information signals are to be read. The servo circuit 109 can be used as the recording layer discriminating means. The servo circuit 109 can discriminate a recording layer to or from which information signals are going to be written or read by detecting a physical relation between the optical head 104 and optical disk 102. The servo circuit 109 controls the optical-coupling efficiency in the optical head 104 on the basis of the result of discrimination of a recording layer to or from which information signals are going to be written or read.

Information on the type, recording area and recording layer of each optical disk may be prerecorded in an area of the disk where TOC is recorded, and the type, recording area and recording layer of the optical disk may be discriminated by reading the information recorded in the TOC area when the optical disk 102 is loaded in the optical disk drive 101.

Here will be illustrated and described the optical head according to the present invention, used in the aforementioned optical disk drive 101.

Figure 2:
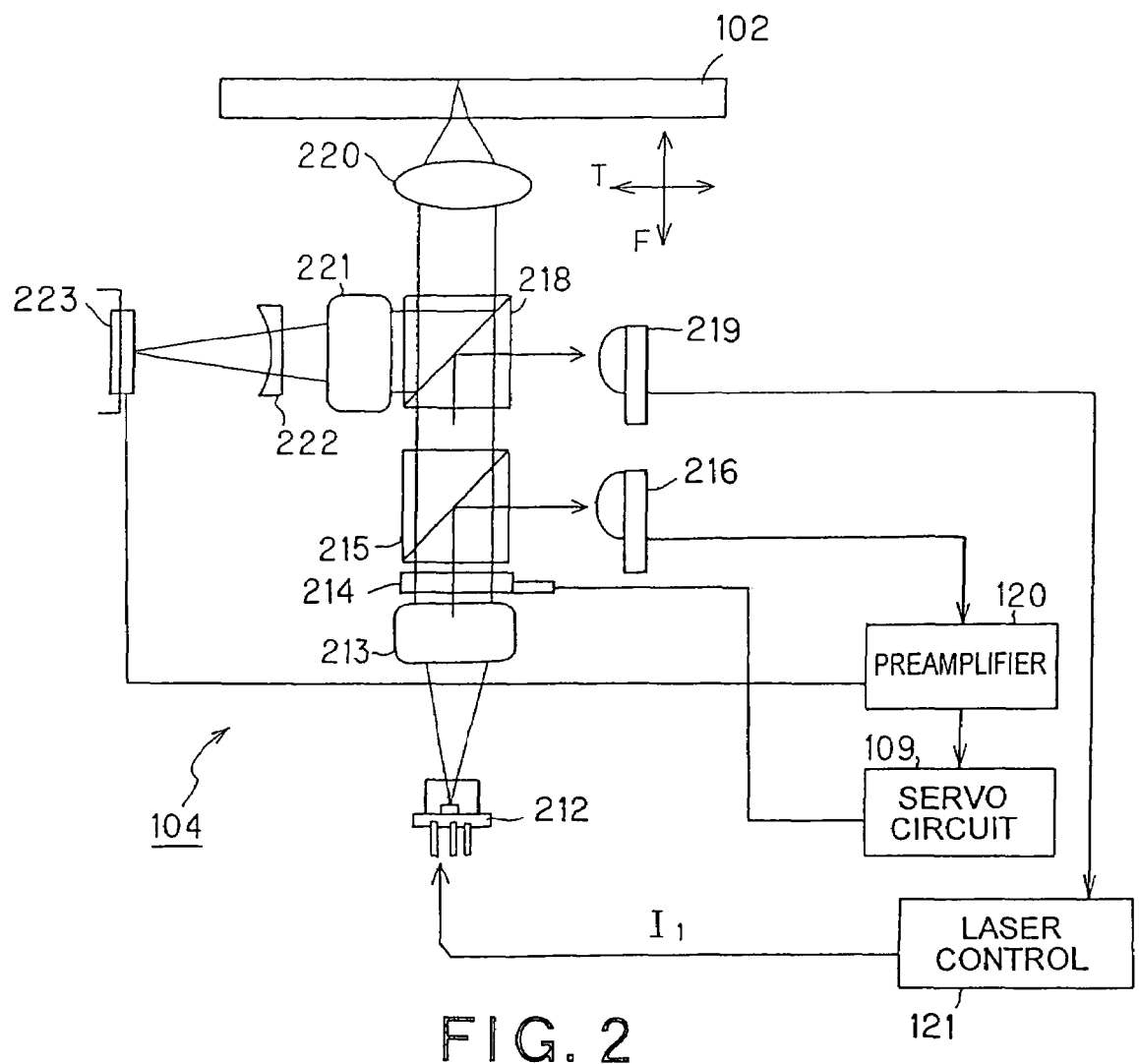
FIG. 2 is a side elevation of an embodiment of the optical head used in the optical disk drive according to the present invention.

As shown in FIG. 2, the optical head 104 includes a semiconductor laser element 212 as light source, collimator lens 213, liquid crystal element 214 and first beam splitter 215, forming together an optical-coupling efficiency varying means, second beam splitter 218, FAPC (front auto power control) detection element 219, objective lens 220, detection lens 221, multi-component lens 222 and a light-detecting element 223. These optical parts are mounted separately.

In the optical head 104, a light beam emitted from the semiconductor laser element 212 is incident upon the collimator lens 213 which will provide a parallel light beam, the parallel light beam is incident upon the liquid crystal element 214, and then the light beam passing by the liquid crystal element 214 is incident upon the first and second beam splitters 215 and 218 in this order. The light beam passing by the beam splitters 215 and 218 is focused by the objective lens 220 onto the signal recording surface of the optical disk 102.

The light beam reflected at the signal recording surface of the optical disk 102 is let by the second beam splitter 218 to travel along a light path separate from the light path along which the light beam emitted from the light source has traveled, and is incident upon the light-detecting element 223 through the detection lens 221 and multi-component lens 222. The light-detecting element 223 detects the return light and provides a detection signal. An RF signal, focus error signal, tracking error signal and the like are generated based on the detection signal.

In the above optical head 104, after the light beam emitted from the semiconductor laser element 212 passes by the liquid crystal element 214 as the optical-coupling efficiency varying element, the latter will vary the optical-coupling efficiency appropriately. Specifically, when the optical disk drive 101 is switched from the mode of operation from write to read, the light beam emitted from the semiconductor laser element 212 is incident upon the optical disk 102 with a smaller optical-coupling efficiency than that in the write mode on the assumption that the light beam is incident upon an optical disk of the same type, same recording area or same recording layer. Also, when the optical disk drive 101 is switched from the read to write mode, the outgoing light beam from the semiconductor laser element 212 is incident upon the optical disk 102 with a larger optical-coupling efficiency than that in the read mode.

Note that the liquid crystal element is not limited to any one that functions as a wave plate but it may be any of a twisted-nematic liquid crystal used to form a display and the like which would be variable in polarized state when the light beam is incident upon the beam splitter.

The semiconductor laser element 212 is supplied with a drive current $I_1$ from the laser controller 121 in the optical head 104. The laser controller 121 may be disposed either outside or inside the optical head 104.

The liquid crystal element 214 is varied in polarized state on the basis of a voltage applied thereto. The voltage applied to the liquid crystal element 214 is controlled by the servo circuit 109. The light beam passing by the liquid crystal element 214 has the polarized state thereof thus varied before incidence upon the first beam splitter 215.

The first beam splitter 215 allows about 100% of P-polarized light beams to pass by, and reflects about 100% of S-polarized light beam. When a phase difference imparted by the liquid crystal element 214 to the light beam is just equal to N wavelengths (N is an integer), namely, in the write mode of the optical disk drive 101, about 100% of the light beam is allowed to pass by the first beam splitter 215.

On the other hand, when the phase difference imparted by the liquid crystal element 214 to the light beam is a half wave short of the N wavelengths, namely, in the read mode, the light beam is polarized in a direction of 45 deg. from a direction in which it is normally polarized, and the first beam splitter 215 allows about 50% of the light beam to pass by while reflecting the rest (about 50%).

The light beam reflected by the first beam splitter 215 is detected by a split-light amount monitoring light-detecting element 216 as an optical-coupling efficiency detecting means. The output of the split-light amount monitoring light-detecting element 216 corresponds to a product of the output power from the semiconductor laser element 212 and light-split rate in the first beam splitter 215 and hence to the optical-coupling efficiency in the optical head 104. It should be noted that as the optical-coupling efficiency is higher, the amount of light incident upon the split-light amount monitoring light-detecting element 216 becomes smaller, while the amount of light incident upon the split-light amount monitoring light-detecting element 216 is larger as the optical-coupling efficiency is lower. The amount of light incident upon the split-light amount monitoring light-detecting element 216 is proportional to 100%−[transmittance in the optical-coupling efficiency varying means (%)]. The output of the split-light amount monitoring light-detecting element 216 is sent to the preamplifier 120.

The light beam passing by the first beam splitter 215 is incident upon the second beam splitter 218. The second beam splitter 218 splits the light beam emitted from the semiconductor laser element 212 into a light beam which will actually travel toward the recording surface of the optical disk 102 through the objective lens 220, and a light beam which will be incident upon the FAPC detection element 219 that monitors the amount of light beam going toward the recording surface. The output of the FAPC detection element 219 is sent to the laser controller 121 which will thus perform an operation for the auto power control. More specifically, the laser controller 121 controls the optical output power of the semiconductor laser element 212 so that the output of the FAPC detection element 219 will be as predetermined. With this control, the incident light beam output power on the surface of the optical disk 102 will be constant. It should be noted that optical output power of the light beam incident upon the optical disk 102 and controlled to the predetermined value on the recording surface of the optical disk 102, is different from the write to read mode as will further be described later and also from one type to another of optical disk. It should also be noted that in the optical head 104 used in the optical disk drive 101 adopting the light intensity modulation, the light beam is a pulsed laser light.

The light beam emitted from the semiconductor laser element 212, split by the beam splitter 218 and passing by the latter is incident upon the objective lens 220. The objective lens 220 focuses the light beam coming to the optical disk 102 onto a point on the recording surface of the optical disk 102. The objective lens 220 is moved in a focusing direction indicated with an arrow F in FIG. 2, parallel to the optical axis of the objective lens 220, and in a tracking direction indicated with an arrow T also in FIG. 2, perpendicular to the optical axis of the objective lens 220, respectively, according to focusing and tracking error signals generated on the basis of a return light detected from the optical disk 102.

The return light from the recording surface of the optical disk 102 is incident upon the second beam splitter 218 via the objective lens 220 again. The second beam splitter 218 will split, by reflection, an amount of light beam corresponding to the reflectance.

The detection lens 221 converts the return light split by the second beam splitter 218 into a convergent light beam, the multi-component lens 222 imparts an astigmatism to the convergent light for the purpose of producing a focus error signal by the astigmatism method, and the resultant light beam is detected by the light-detecting element 223. A focusing error signal, tracking error signal and RF signal can be produced on the basis of a detection output of the light-detecting element 223.

In the optical disk drive 101 according to the present invention, there is given a following relation:

$$CEW > CER$$

where CEW (coupling-efficiency write) is an optical-coupling efficiency of the light beam emitted from the semiconductor laser element 212 and guided to the optical disk 102 when the optical disk drive 101 is in the write mode, and CER (coupling-efficiency read) is an optical-coupling efficiency of the light beam emitted from the semiconductor laser element 212 and guide to the optical disk 102 when the optical disk drive 101 is in the read mode.

The above is also true in case the optical-coupling efficiency of the light beam guided to the optical disk 102 is different from one type to another of the optical disk 102 loaded in the optical disk drive 101 according to the present invention.

Therefore, by varying the optical-coupling efficiency by means of the optical-coupling efficiency varying element from writing information signals to the optical disk to reading information signals from the optical disk, or from one type to another of an optical disk loaded in the optical disk drive, it is possible to vary the level of a light beam focused on the recording surface of the optical disk largely from the write to read mode or from one type to another of the loaded optical disk without having to emit a light beam from the light source with an extremely large difference in output power between the write and read modes. The optical-coupling efficiency can be varied correspondingly to a writing or reading power of the light beam focused on the signal recording surface, which is optimum for each of different optical disk types, each of different recording areas to and from which information signals are written or read or for each of different recording layers to and from which information signals are written or read. It should be noted that the relation between the optical-coupling efficiency and the optical power of a light beam focused on the signal recording surface of an optical disk is reversed depending upon the configuration of the optical system in the optical head.

Thus, the optical disk drive according to the present invention can show good characteristics in writing or reading information signals since it can write or read the information signals to or from the signal recording surface of an optical disk with a level of a light beam, which is optimum for each of the modes of writing or reading the information signals, for each of different optical disk types, each of different recording areas to and from which information signals are written or read or for each of different recording layers to and from which information signals are written or read.

The optical-coupling efficiency varying element included in the optical head according to the present invention functions as will be described in detail below.

First, an optical-coupling efficiency (CEW) in writing information signals, and optical-coupling efficiency (CER) in reading information signals, is given as follows:

$$CEW = CE0 \times TW$$

$$CER = CE0 \times TR$$

where CE0 is an optical-coupling efficiency in case no optical-coupling efficiency varying element is used, TW is a transmittance in the optical-coupling efficiency varying element when the optical head is in the signal writing mode and TR is a transmittance in the optical-coupling efficiency varying element when the optical head is in the signal reading mode.

A necessary light beam output (LDW) from the light source for writing information signals, and necessary light beam output (LDR) from the light source for reading information signals, is given as follows:

$$LDW = PW/CEW = PW/(CE0 \times TW)$$

$$LDR = PR/CER = PR/(CE0 \times TR)$$

where PW is a necessary amount of light beam on the recording surface for writing information signals and PR is a necessary amount of light beam on the recording surface for reading information signals.

Next, a necessary dynamic range (LDW/LDR) for the optical power of the light source is given as follows:

$$LDW/LDR = (PW/PR) \times (TR/TW)$$

Note that if no optical-coupling efficiency varying element is used, it means that TR=TW. Thus, in the optical disk drive according to the present invention, the necessary dynamic range for the optical power of the light source when the latter emits a light beam can be varied depending upon the transmittance in the optical-coupling efficiency varying element.

Multiple types of optical disks different in specification from each other are selectively usable in one optical disk drive for writing or reading information signals as will be discussed below. The multiple types of optical disks different in specification from each other include those different in recording method from each other, a multilayer optical disk having multiple signal recording layers, an optical disk that is rotated at a high velocity for writing or reading information signals, etc. as having previously been described.

In an optical disk drive capable of selectively playing optical disks different in specification from each other, a semiconductor laser is used as the light source included in the optical head. The semiconductor laser provides an optical output power of 4 mW which can assure a stable emission of laser light and a sufficient suppression of laser noise, and has a maximum optical-output rating of 60 mW.

Here, it is assumed that an amount of light beam focused on the signal recording surface a first optical disk A designed according to a certain specification, that is required for writing of information signals because of the characteristic of the optical disk A, is PW(A), an amount of light beam focused on the signal recording surface of the optical disk A, required for reading information signals because of the characteristic of the optical disk A, is PR (A), and the required light amounts PW(A) and PW(B) are as follows:

$$PW(A) = 20 \text{ mW}$$

$$PR(A) = 2 \text{ mW}$$

Also, it is assumed an amount of light beam focused on the signal recording surface a second optical disk B designed according to a certain specification, that is required for writing of information signals because of the characteristic of the optical disk B, is PW(B), an amount of light beam focused on the signal recording surface of the optical disk B, required for reading information signals because of the characteristic of the optical disk A, is PR(B), and the required light amounts PW(B) and PR(B) are as follows:

$PW(B)=10$ mW $PR(B)=1$ mW

In this case, the dynamic range of the optical output power of the laser source can be given as follows if no optical-coupling efficiency varying means is used:

Dynamic range of light-source optical output power=60 mW/4 mW=15

The dynamic range of the required optical output power on the signal recording surface of the optical disk can be given as follows:

Dynamic range of required optical output power $=LDW(A)/LDR(B)=PW(A)/PR(B)=20$ mW/1 mW=20

That is, since the dynamic range of the light-source optical output power is smaller than that of the required optical output power on the signal recording surface of the optical disk, the above light source will not permit to write or read information signals accurately.

On the other hand, when the optical-coupling efficiency varying means included in the optical head of the optical disk drive according to the present invention, the dynamic range of the optical output power will be as follows.

It is assumed here that the transmittance in the optical-coupling efficiency varying means, required for writing information signals to the first optical disk A, is T1, and that required for reading information signals from the second optical disk B is T2 and that T1=100% while T2=50%. In this case, the dynamic range of the required optical output power can be given as follows:

Dynamic range of required optical output power $=LDW(A)/LDR(B)=\{PW(A)/PR(B)\}\times(R2/T1)$ $=(20$ mW/1 mW$)\times(50\%/100\%)=10$ That is, since the dynamic range of the required optical output power is smaller than that of the light-source optical output power, a dynamic range within the light-source optical output dynamic range will permit to write information signals to the first optical disk A and read information signals from the first optical disk B.

In this case, when the optical system of the optical head is designed for the light-source optical output power to be CE0=40%, the optical-coupling efficiency CE1 for writing information signals to the first optical disk A and that CE2 for reading information signals from the second optical disk B will have the following relation with each other:

$CE1=CE0\times T1=40\%$ $CE2=CE0\times T2=20\%$

Therefore, the necessary light-source optical output power will be as follows:

That is, the light-source optical output power for writing information signals to the first optical disk A will be:

$LDW(A)=PW(A)/CE1=20$ mW/40%=50 mW

The light-source optical output power for reading information signals from the second optical disk B will be:

$LDR(B)=PR(B)/CE2=1$ mW/20%=5 mW

As above, with the light source of which the maximum rating of optical output power is 60 mW, it is possible to write information signals with an optical output power of 50 mW and also to read information signals accurately with an optical output power of 5 mW not so larger than the optical output power of 4 mW which allows a sufficient suppression of laser noise.

At this time, the necessary light-source optical output power for reading information signals from the first optical disk A will be as follows:

$LDR(A)=PR(A)/CE1=2$ mW/40%=5 mW $LDR(A)=PR(A)/CE2=2$ mW/20%=10 mW

Also, the necessary light-source optical output power for recording information signals to the second optical disk B will be as follows:

$LDW(B)=PW(B)/CE1=10$ mW/40%=25 mW $LDW(B)=PW(B)/CE2=10$ mW/20%=50 mW

In this case, either the optical-coupling efficiency CE1 or CE2 may be used.

Note that since selection of the optical-coupling efficiency for write or read of information signals takes a fixed length of time as will be described later, the optical-coupling efficiency CE1 should be used more conveniently for the first optical disk A and the optical-coupling efficiency CE2 be used for the second optical disk B.

With information on recommended writing and reading optical powers being prerecorded on each optical disk used in the optical disk drive according to the present invention, it will be possible to write or read information signals to or from any optical disk with the recommended writing or reading optical power by controlling the writing or reading optical power on the basis of the prerecorded information.

It is assumed here that the recommended writing and reading powers for an optical disk having a specification are PW0 and PR0, an optical-coupling efficiency when the transmittance in the optical-coupling efficiency varying means is about 100% is 40% while that when the transmittance in the optical-coupling efficiency varying means is reduced is 20%, the assumed range of PW0 is 9 to 22.5 mW and range of PR0 is 0.9 to 2.25 mW.

Figure 3:
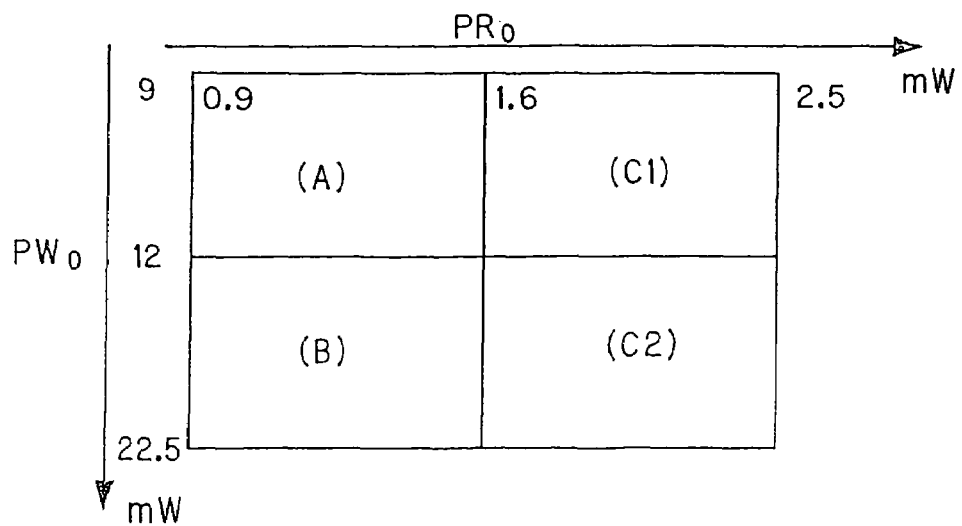
FIG. 3 graphically illustrates a relation between recommended reading optical power and writing optical power for an optical disk to be used in the optical disk drive.

It is judged which of four ranges (A), (B), (C1) and (C2) as shown in FIG. 3 a combination of PR0 and PW0 read from the optical disk falls in, and a light-attenuated state, that is, a transmittance in the optical-coupling efficiency varying means, when the optical disk drive is in the write or read mode, is set for any one, thus determined, of the four ranges of the recommended writing or reading optical power PR0 or PW0.

That is, taking the dynamic range of a light source used in the optical head in consideration, the transmittance in the optical-coupling efficiency varying means has to be reduced when PP0≦1.6 mW, and also the transmittance has to be increased when PW0≧1.2 mW.

Therefore, in case the combination of PW0 and PR0 falls in the range (A) in FIG. 3, the transmittance in the optical-coupling efficiency varying means has to be reduced for the read mode. For the write mode, the transmittance may be left as it is. Taking account of the time required for selection of the optical-coupling efficiency for write or read of information signals, however, the transmittance in the optical-coupling efficiency varying means should preferably be always set lower.

In case the combination of PW0 and PR0 falls in the range (B) in FIG. 3, the transmittance in the optical-coupling efficiency varying means has to be elevated for the read mode, while the transmittance has to be lowered for the write mode. So, the light-attenuated state should be changed by switching the mode of operation between write and read.

In case the combination of PW0 and PR0 falls in the range (C1) in FIG. 3, the transmittance in the optical-coupling efficiency varying means may be left as it is for both the write and read modes. Therefore, the transmittance may always be high.

In case the combination of PW0 and PR0 falls in the range (C2) in FIG. 3, the transmittance in the optical-coupling efficiency varying means may be left as it is for the read mode but has to be elevated for the write mode. So, taking account of the time required for selection of the optical-coupling efficiency for write or read of information signals, the transmittance in the optical-coupling efficiency varying means should preferably be always set higher.

Therefore, when the combination of PW0 and PR0 falls in the ranges (C1) and (C2) in FIG. 3, the transmittance in the optical-coupling efficiency varying means should preferably be always high.

In case an optical disk encased in a disk cartridge is used with the optical disk drive according to the present invention, information indicative of a recommended writing and reading optical powers corresponding to the optical disk in the cartridge may be provided on the cartridge. In this case, the information indicating the recommended writing and reading optical powers may be formed as two holes in a part of the cartridge to identify the four ranges in FIG. 3, whereby it is possible to make the above-mentioned operations.

Alternatively, the value of the optical-coupling efficiency may appropriately be set within a range meeting the dynamic range of the light source. The optical-coupling efficiency may be set to have three or more values in some cases. In the latter case, the light source can be produced more easily. The optical head according to the present invention can accommodate optical disks different in specification from each other and assure accurate write and read of information signals without having to use any special light source.

In the optical disk drive 101, selection of a multilayer optical disk having a plurality of recording layers formed therein and a single-layer optical disk is controlled as will be described below.

When any of the above optical disks 102 is loaded in the optical disk drive 101, disk discrimination data recorded in a TOC area on the loaded optical disk 102 is read with a reading optical power smaller than the optimum writing optical power of a light beam used for writing information signals to the multilayer optical disk, for example, with a reading optical power of a light beam used for reading the single-layer optical disk. In case the data thus read indicates a multilayer optical disk, the optical head 104 is set for writing or reading optical power and optical-coupling efficiency suitable for the multilayer optical disk.

Figure 4A:
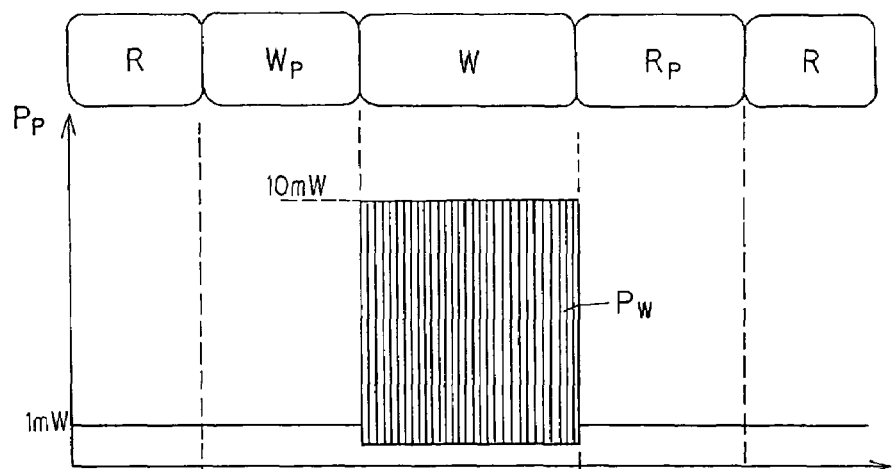
FIGS. 4A to 4D are timing diagrams showing the laser light state which varies when the optical disk drive is switched in mode of operation between write and read.
Figure 4B:
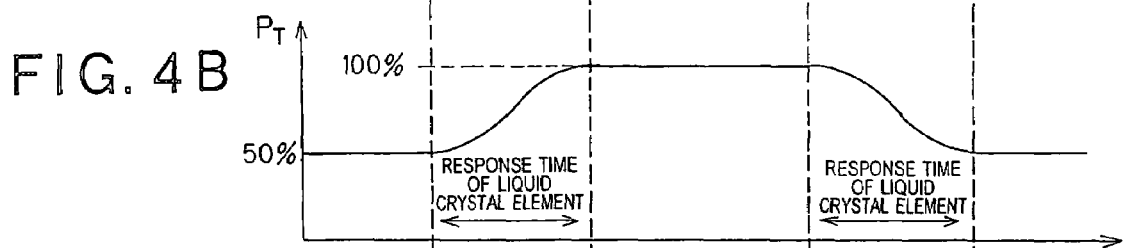
Figure 4C:
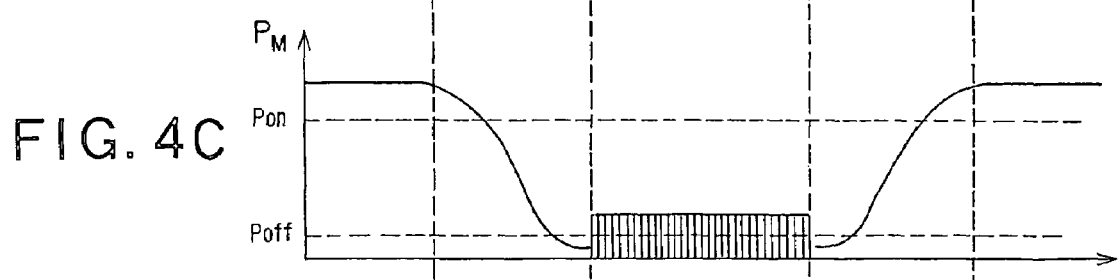
Figure 4D:
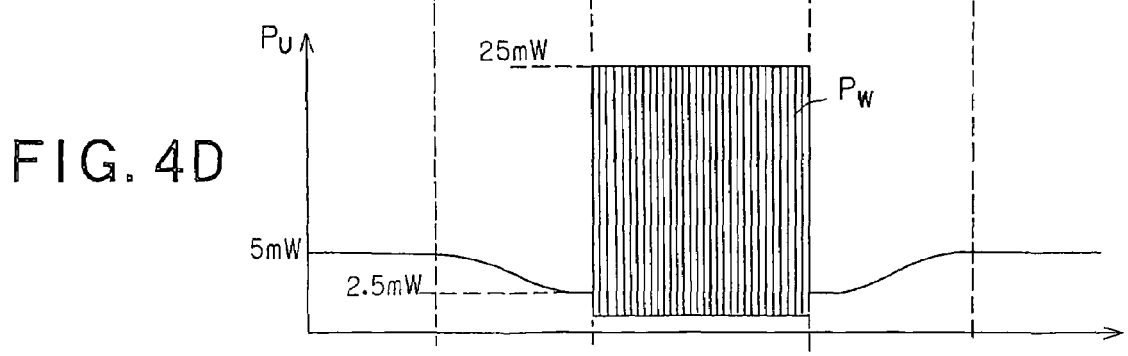

The optical disk drive 101 in which the above-mentioned multilayer and single-layer optical disks are selectively used is switched between the write and read modes as will be described below:

FIGS. 4A to 4D are timing diagrams showing the laser light state which varies when the optical disk drive 101 is switched in mode of operation between write and read. FIG. 4A shows an amount of light focused on the signal recording surface of the optical disk 102, that is, an on-disk light power $P_P$, FIG. 4B shows a transmittance $P_T$ in the optical-coupling efficiency varying element, FIG. 4C shows an output $P_M$ of the split-light amount monitoring light-detecting element 216, and FIG. 4D shows a variation of the laser output power $P_U$.

In the optical disk drive 101, the laser controller 121 switches the mode of operation between write W and read R with precise timing according to a command from the system controller 107 after the liquid crystal element 214 starts to respond as will be described below:

More specifically, in the read mode R, the liquid crystal element 214 is applied with an appropriate voltage by the servo circuit 109 so that there will occur a phase difference with which the liquid crystal element 214 works as a half-wave plate, and the transmittance $P_T$ in the optical-coupling efficiency varying element is set to 50% as shown in FIG. 4B. At this time, the laser output power $P_U$ is 5 mW as shown in FIG. 4D, and the reading characteristic is good with low laser noise.

When the optical disk drive 101 is switched in mode of operation from read R to write W, first the servo circuit 109 varies the voltage applied to the liquid crystal element 214 according to the command from the system controller 107 to change the phase difference of the liquid crystal element 214.

With a response from the liquid crystal element 214, the transmittance $P_T$ in the optical-coupling efficiency varying element is varied from 50% to 100% as shown in FIG. 4B, and the laser output power $P_U$ is varied from 5 mW to 2.5 mW as shown in FIG. 4D under the effect of the auto power control operation. At this time, the output $P_M$ of the split-light amount monitoring light-detecting element 216 is also lowered correspondingly to the variation of the transmittance $P_T$ of the optical-coupling efficiency varying element and variation of the laser output power $P_U$. Since the liquid crystal element is limited in response speed, the power $P_P$ of light focused on the optical disk is held as a reading optical power as shown in FIG. 4A during a write preparation $W_P$, which is a transition of the response. The output $P_M$ of the split-light amount monitoring light-detecting element 216 is supplied to the servo circuit 109 via the preamplifier 120. When the output $P_M$ is lower than a preset output level reference value Poff as shown in FIG. 4C, it is determined that the transmittance $P_T$ in the optical-coupling efficiency varying element has become nearly 100% as shown in FIG. 4B, and the laser controller 121 generates a signal write pulse $P_W$ according to a command supplied from the signal modem/ECC block 108 via the system controller 107. Thus the laser output power $P_U$ is modulated as shown in FIG. 4D, and information signals will be written to the optical disk 102.

Next, the laser controller 121 first switches the mode of operation from write W to read R according to a command from the system controller 107. In this condition, since the laser output power $P_U$ is as low as 2.5 mW as shown in FIG. 4D, the laser noise is high.

After the laser output power is changed to a reading optical power, the servo circuit 109 varies the voltage applied to the liquid crystal element 214 according to a command from the system controller 107 to change the phase difference in the liquid crystal element 214.

During a period of read preparation $R_P$, of the response time of the liquid crystal element 214, the transmittance $P_T$ in the optical-coupling efficiency varying element is varied from 100% to 50%, the laser output power $P_U$ is varied from 2.5 mW to 5 mW under the effect of the auto power control operation, and thus a quality read signal can be detected with a suppression of laser noise. At this time, when the output $P_M$ of the split-light amount monitoring light-detecting element 216 exceeds a preset reference value Pon as shown in FIG. 4C, it is determined that the optical-coupling efficiency has been reduced to a sufficient extent, and signal read is started. In some cases, upon switching to the read mode R, the signal read may be started, and the signal read may be retried while laser noise causes an error in the read signal. At this time, the output $P_M$ of the split-light amount monitoring light-detecting element 216 is also elevated correspondingly to the variation of the transmittance $P_T$ of the optical-coupling efficiency varying element and variation of the laser output power $P_U$ as shown in FIG. 4C.

If the switching between the write and read modes has not been effected as above, the following trouble will take place:

First, in case the optical disk drive 101 is switched in mode of operation from read R to write W, the writing operation will start with the optical output power being still high, that is, with the optical-coupling efficiency being still small. So, if the semiconductor laser element is operated to provide an optical output exceeding the maximum rating of optical output power of the semiconductor laser element, the latter will possibly be damaged.

In case the mode of operation is switched from write W to read R, the reading operation will start with the optical output power being still low, that is, with the optical-coupling efficiency being still large. So, if the semiconductor laser element is operated to provide an optical output exceeding the maximum rating of optical output power, it will possibly be damaged. So, no good reading characteristic will be assured because of much laser noise. Also, in case the optical-coupling efficiency is first reduced after completion of a writing operation, the semiconductor laser element will possibly be damaged if it is operated to provide an optical output exceeding the maximum rating of optical output power of the semiconductor laser element.

By switching the mode of operation between write and read following the above procedure, it is possible to sufficiently suppress the laser noise when reading information signals even with a small ratio between the writing and reading optical output powers of light beams. Using a light source whose maximum rating of optical output power is small, the optical disk drive can write and read information signals accurately. To prevent the semiconductor laser element from being damaged as above, write or read should be started with precise timing and after the optical-coupling efficiency has completely been varied by the optical-coupling efficiency varying element, or the start and end of the operation of varying the optical-coupling efficiency (for increase or decrease of the optical-coupling efficiency) should be detected and controlled by some means before starting the write or read of information signals.

The start and end of the operation of varying the optical-coupling efficiency (for increase or decrease of the optical-coupling efficiency) can be detected as follows:

For example, to vary the optical-coupling efficiency mechanically, a position sensor or the like can be used to detect the operating state of the optical head. A variation of the optical output power can be detected on the basis of an output from a rear-monitor terminal of the semiconductor laser, namely, output from a light-detecting element that monitors a light beam going in a direction opposite to the normal outgoing direction, or by detecting, by a light-detecting element, a part of a light beam not arriving at the optical disk and which is not used for writing or reading information signals.

To vary the ratio of beam splitting by a beam-splitting membrane, the light-detecting element should be provided to detect a split optical power as above.

The optical disk drive constructed as above according to the present invention operates as will be described below with reference to the flow chart shown in FIGS. 5 to 11.

First, the output of the split-light amount monitoring light-detecting element 216 is used to vary the optical-coupling efficiency at the time of switching between the write and read modes as will be described below. The optical disk drive 101 has three modes of operation: write, read and standby. When the write mode is represented by "W", read mode is by "R" and standby mode is by "-", the modes of operation are changed over in the following order:

[R-W-W-R-R-R-W-R-W-R-R]

Figure 5:
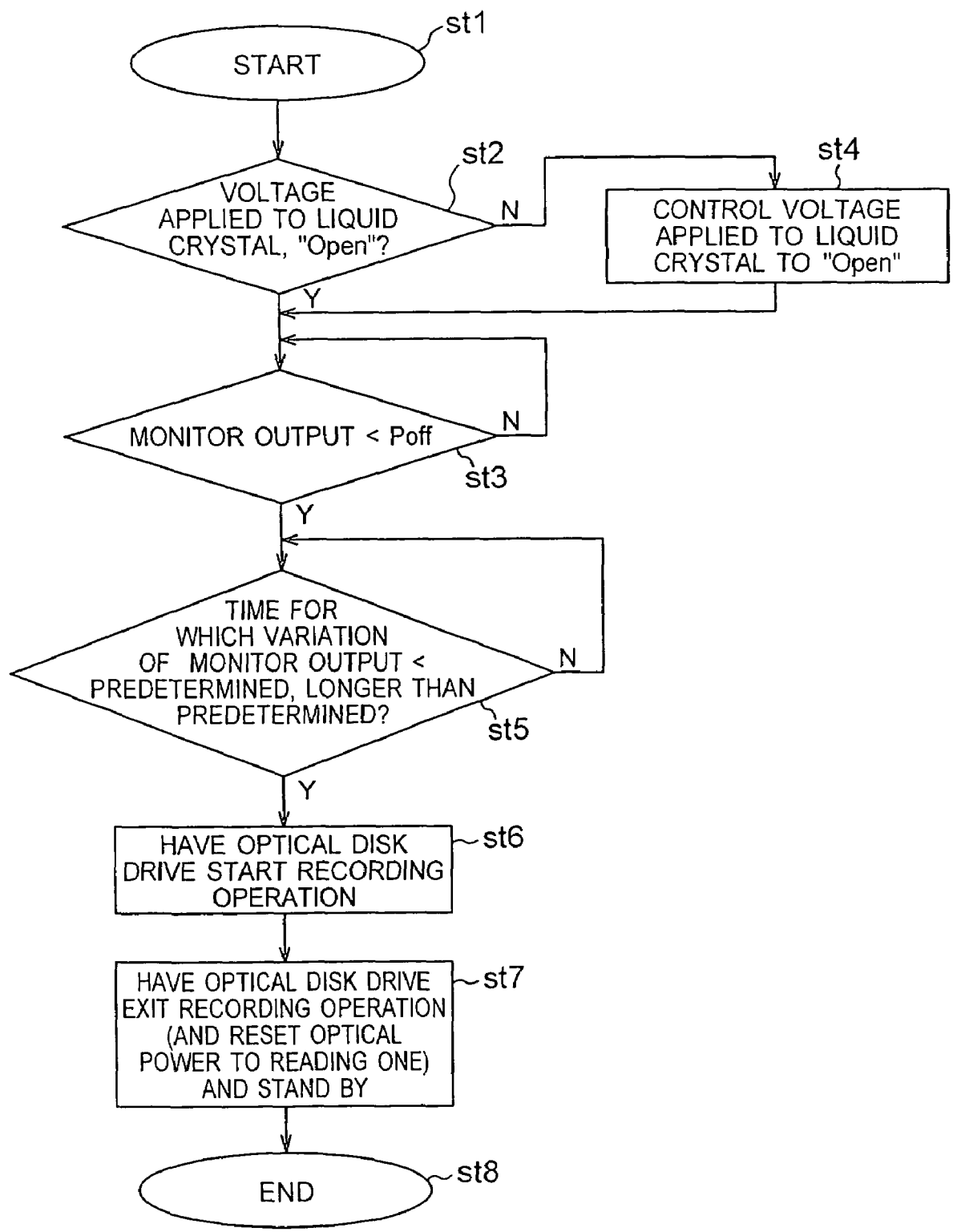
FIG. 5 shows a flow of operations made in the optical disk drive, showing that the optical disk drive being in the standby state holds a preceding light-attenuated state and selects another light-attenuated state after reception of a write command.
Figure 6:
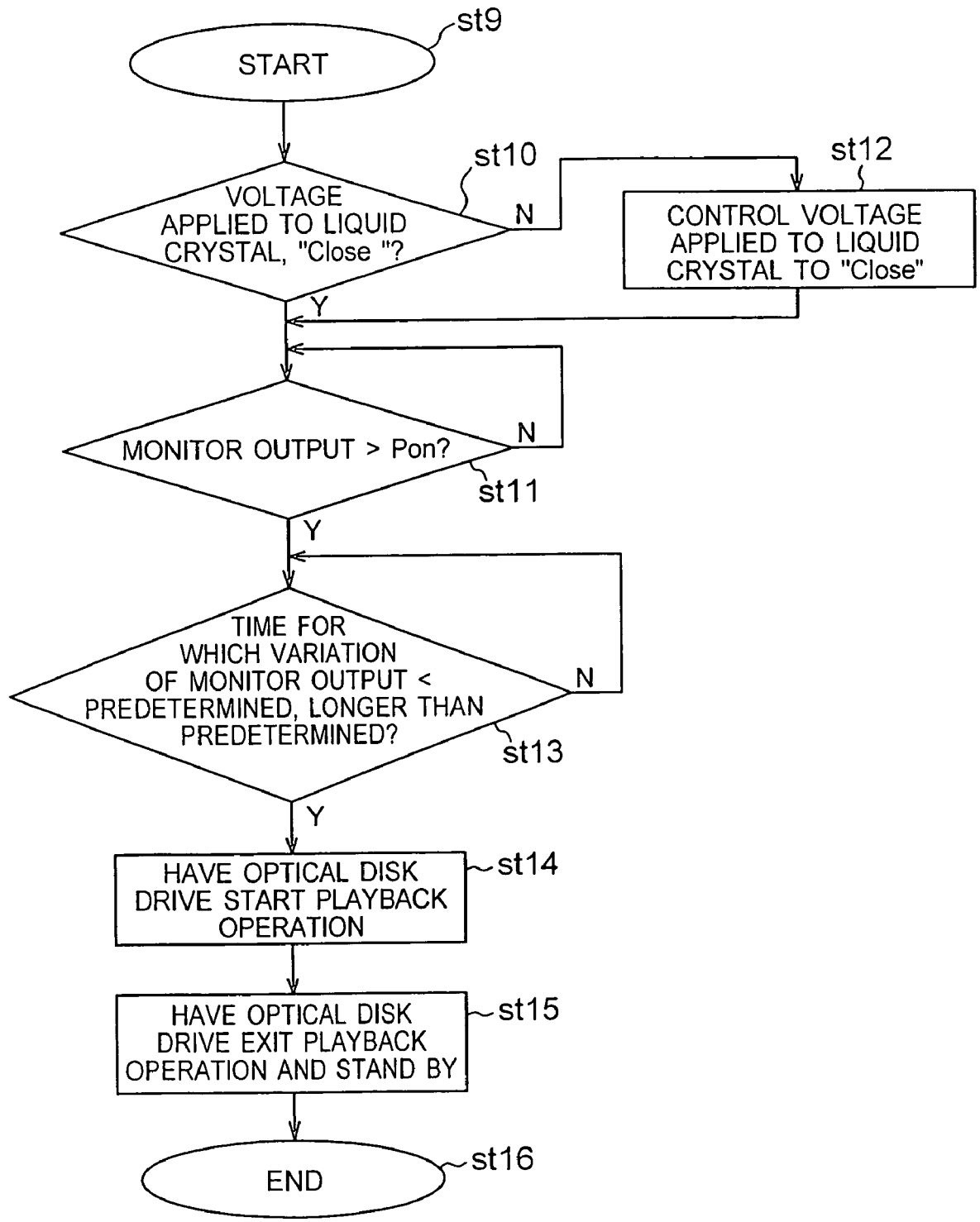
FIG. 6 sows a flow of operations made in the optical disk drive, showing that the optical disk drive being in the standby state always holds a preceding light-attenuated state and selects another light-attenuated state after reception of a read command.

The optical-coupling efficiency is varied, namely, the light-attenuated state is changed in any of the following three cases, for example:

(1) The optical disk drive 101 being in the standby mode keeps a preceding light-attenuated state, and selects another light-attenuated state upon reception of a next command for "read" or "write". The operations made for this light-attenuated state selection is shown in FIGS. 5 and 6.

Figure 7:
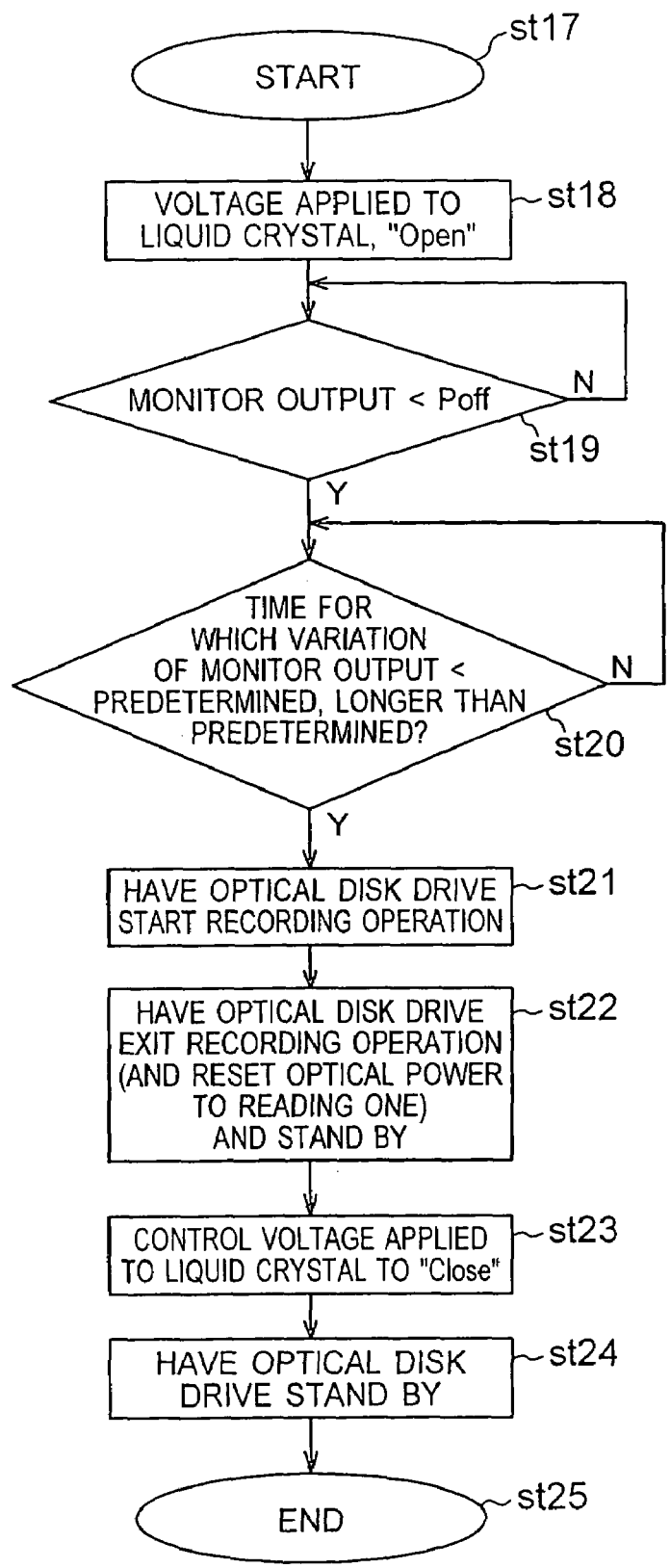
FIG. 7 shows a flow of operations made in the optical disk drive supplied with a write command, showing that the optical disk drive being in the standby state always holds a light-attenuated state in which the optical-coupling efficiency is low and selects, only upon reception of a write command, another light-attenuated state in which the optical-coupling efficiency is high.
Figure 8:
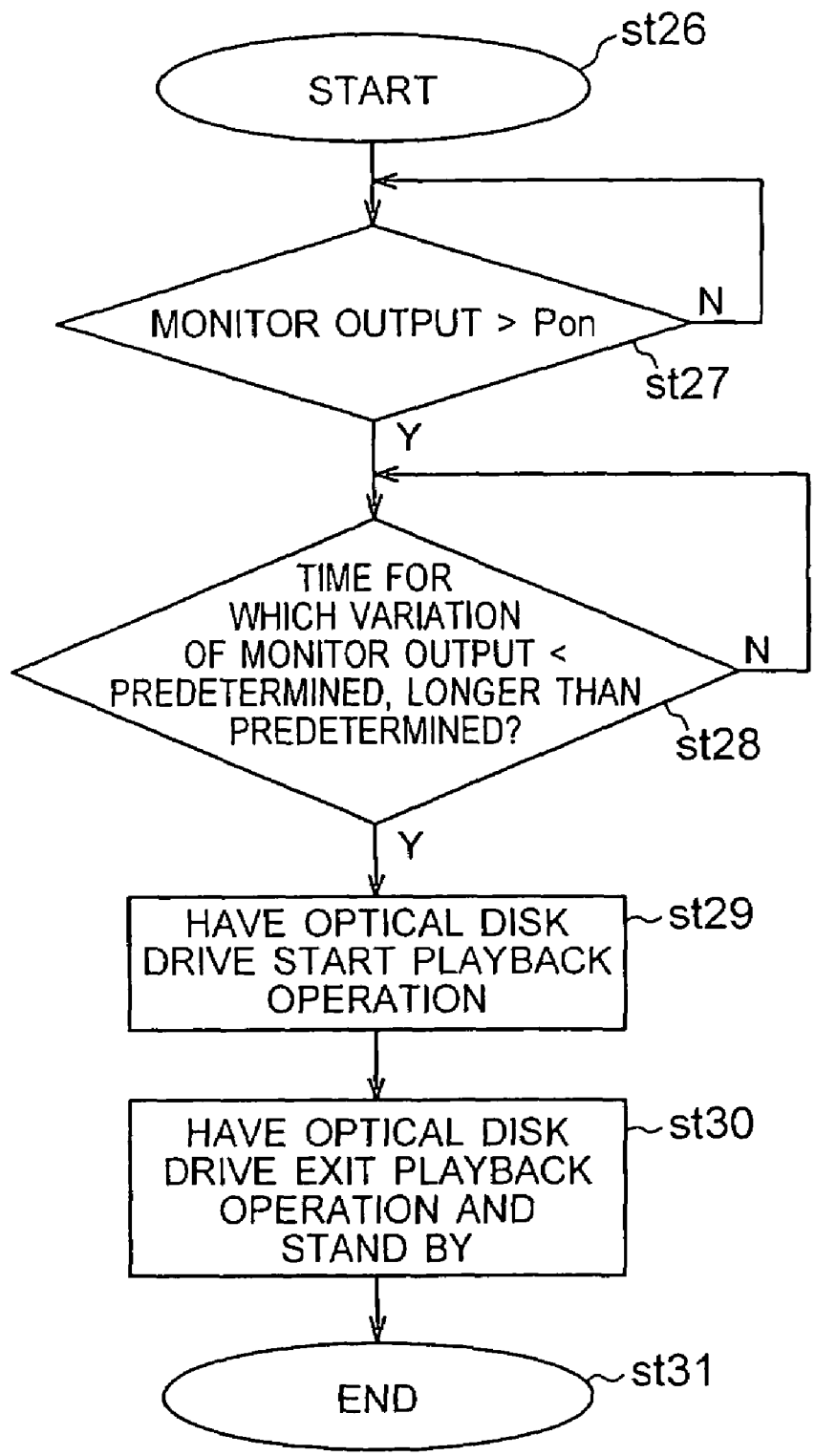
FIG. 8 shows a flow of operations made in the optical disk drive supplied with a read command, showing that the optical disk drive being in the standby state always holds a light-attenuated state in which the optical-coupling efficiency is low and selects, only upon reception of a read command, another light-attenuated state in which the optical-coupling efficiency is high.

(2) The optical disk drive 101 being in the standby mode always holds a light-attenuated state in which the optical-coupling efficiency is low, and selects, only upon reception of a write command, a light-attenuated state in which the optical-coupling efficiency is high. The operations made for this light-attenuated state selection is shown in FIGS. 7 and 8.

Figure 9:
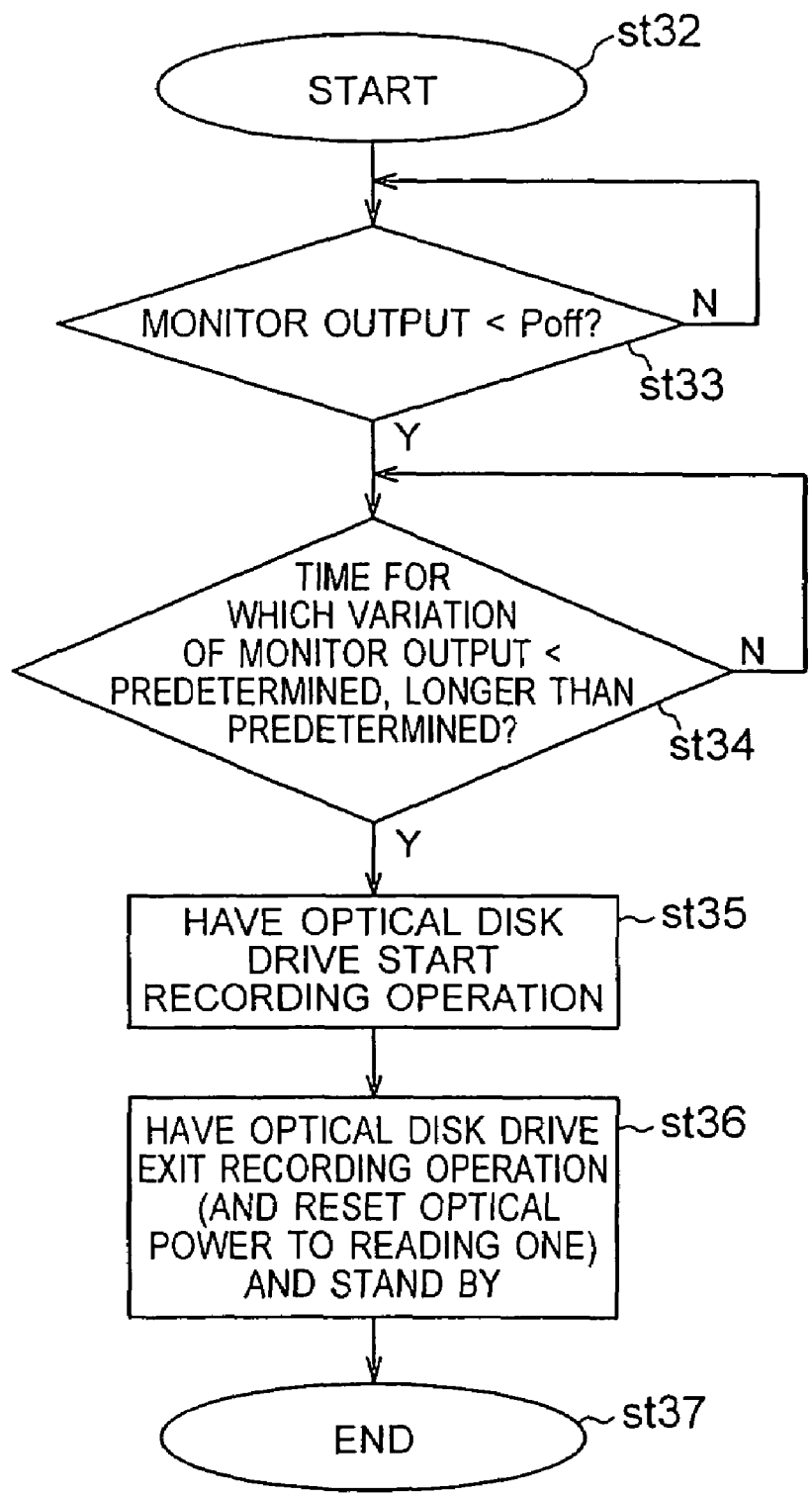
FIG. 9 shows a flow of operations made in the optical disk drive supplied with a write command, showing that the optical disk drive being in the standby state always holds a light-attenuated state in which the optical-coupling efficiency is high and selects, only upon reception of a write command, another light-attenuated state in which the optical-coupling efficiency is low.
Figure 10:
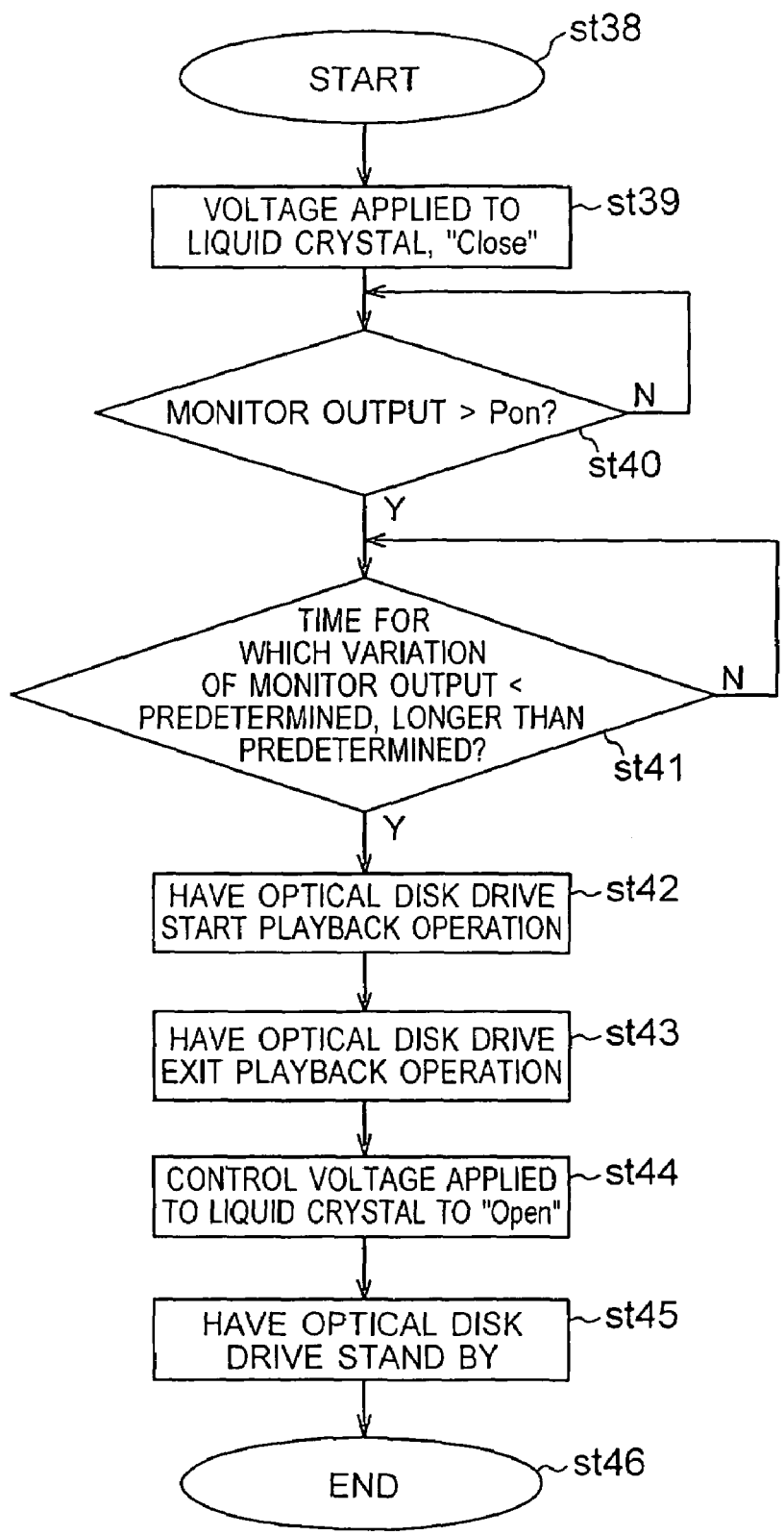
FIG. 10 shows a flow of operations made in the optical disk drive supplied with a read command, showing that the optical disk drive being in the standby state always holds a light-attenuated state in which the optical-coupling efficiency is high and selects, only upon reception of a read command, another light-attenuated state in which the optical-coupling efficiency is low.

(3) The optical disk drive 101 being in the standby mode always holds a light-attenuated state in which the optical-coupling efficiency is high, and selects, only upon reception of a read command, another light-attenuated state in which the optical-coupling efficiency is low. The operations made for this light-attenuated state selection is shown in FIGS. 9 and 10.

The above three example cases will be described below.

In the standby mode, the optical disk drive 101 holds a preceding light-attenuated state, and selects another light-attenuated state after reception of a command for next "read" or "write". First, the operations made in the optical disk drive 101 will be described with reference to FIGS. 5 and 6.

When the optical disk drive 101 is in the standby mode, the system controller 107 controls the optical disk drive 101 hold the preceding light-attenuated state and select another light-attenuated state after reception of a command for next read or write. Receiving a write command, the system controller 107 starts up in step st1 as shown in FIG. 5. Next in step st2, the system controller 107 controls the voltage applied to the liquid crystal element and judges whether the applied voltage is a voltage for a higher optical-coupling efficiency (voltage corresponding to "Open"). When the system controller 107 has determined the voltage applied to the liquid crystal element to be a voltage for a higher optical-coupling efficiency, it goes to step st3. If the system controller 107 has determined the applied voltage to be a voltage for a lower optical-coupling efficiency, it goes to step st4. In step st4, the system controller 107 controls the voltage applied to the liquid crystal element to a voltage for a higher optical-coupling efficiency (voltage corresponding to "Open") and goes to step st3. In step st3, the system controller 107 judges whether the output of the split-light amount monitoring light-detecting element 216 is lower than predetermined (reference value Poff). When the system controller 107 has determined the output to be lower than predetermined (reference value Poff), it goes to step st5. If the system controller 107 has determined the output not to be lower than predetermined (reference value Poff), it will stay in step st3. In step st5, it will judge whether the time for which the variation of the output of the split-light amount monitoring light-detecting element 216 has been smaller than predetermined is longer than predetermined. When the system controller 107 has determined the time to be longer than predetermined, it goes to step st6. If the system controller 107 has determined the time not to be longer than predetermined, it will stay in step st5. In step st6, the system controller 107 has the optical disk drive 101 start a writing operation. When the optical disk drive 101 should exit the writing operation, the system controller 107 goes to step st7 where it will have the optical disk drive 101 exit the writing operation, restore the light beam output power to the reading power, and go back to the standby mode. In step st8, the system controller 107 exits the operation. When the optical disk drive 101 is in the standby mode, the light source is ready for emission of a laser beam having a reading power.

Next, when the optical disk drive 101 is in the standby mode, the system controller 107 controls the optical disk drive 101 to hold the preceding light-attenuated state and select another light-attenuated state after reception of a command for next read or write. When the optical disk drive 101 receives a read command, the system controller 107 starts up in step st9 as shown in FIG. 6. Next in step st10, the system controller 107 controls the voltage applied to the liquid crystal element, and judges whether the applied voltage is a voltage for a lower optical-coupling efficiency (voltage corresponding to "Close"). When the system controller 107 has determined the applied voltage to be a voltage for a lower optical-coupling efficiency, it goes to step st11. If the system controller 107 has determined the applied voltage to be a voltage for a higher optical-coupling efficiency, it goes to step st12 where it will control the voltage applied to the liquid crystal element to a voltage for a lower optical-coupling efficiency (voltage corresponding to "Close") and then go to step st11. In step st11, the system controller 107 judges whether the output of the split-light amount monitoring light-detecting element 216 is higher than predetermined (reference value Pon). When the system controller 107 has determined the output to be higher than predetermined (reference value Pon), it goes to step st13. If the system controller 107 has determined the output not to be higher than predetermined (reference value Pon), it will stay in step st11. In step st13, it will judge whether the time for which the variation of the output of the split-light amount monitoring light-detecting element 216 has been smaller than predetermined is longer than predetermined. When the system controller 107 has determined the time to be longer than predetermined, it goes to step st14. If the system controller 107 has determined the time not to be longer than predetermined, it will stay in step st13. In step st14, the system controller 107 has the optical disk drive 101 start a reading operation. When the optical disk drive 101 should exit the reading operation, the system controller 107 goes to step st15 where it will have the optical disk drive 101 exit the reading operation, and go back to the standby mode. In step st16, the system controller 107 exits the operation. When the optical disk drive 101 is in the standby mode, the light source is ready for emission of a laser beam having a reading power.

In the standby mode, the optical disk drive 101 always holds a light-attenuated state in which the optical-coupling efficiency is low, and selects another light-attenuated state only upon reception of a write command. The operations made in the optical disk drive 101 will be described with reference to FIGS. 7 and 8.

When the optical disk drive 101 is in the standby mode, the system controller 107 controls the optical disk drive 101 hold a light-attenuated state in which the optical-coupling efficiency is low and select another light-attenuated state only upon reception of a write command. Receiving a write command, the system controller 107 starts up in step st17 as shown in FIG. 7. Next in step st18, the system controller 107 controls the voltage applied to the liquid crystal element to a voltage for a higher optical-coupling efficiency (voltage corresponding to "Open"), and then goes to step st19. In step st19, the system controller 107 judges whether the output of the split-light amount monitoring light-detecting element 216 is lower than predetermined (reference value Poff). When the system controller 107 has determined the output to be lower than predetermined (reference value Poff), it goes to step st20. If the system controller 107 has determined the output not to be lower than predetermined (reference value Poff), it will stay in step st19. In step st20, it will judge whether the time for which the variation of the output of the split-light amount monitoring light-detecting element 216 has been smaller than predetermined is longer than predetermined. When the system controller 107 has determined the time to be longer than predetermined, it goes to step st21. If the system controller 107 has determined the time not to be longer than predetermined, it will stay in step st20. In step st21, the system controller 107 has the optical disk drive 101 start a writing operation. When the optical disk drive 101 should exit the writing operation, the system controller 107 goes to step st22 where it will have the optical disk drive 101 exit the writing operation, restore the light beam output power to the reading power and then go to step st23. In step st23, the system controller 107 controls the voltage applied to the liquid crystal element to a voltage for a lower optical-coupling efficiency (voltage corresponding to "Close") and then goes to step st24. In step st24, the system controller 107 shifts the optical disk drive 101 to the standby mode. In step st25, the system controller 107 exits the operation. It should be noted that when the optical disk drive 101 is in the standby mode, the light source is read for emission of a laser beam having a reading power and the voltage applied to the liquid crystal element is for a lower optical-coupling efficiency.

Further, when the optical disk drive 101 is in the standby mode, the system controller 107 controls the optical disk drive 101 to always hold a light-attenuated state in which the optical-coupling efficiency is low, and select, only upon reception of a write command, another light-attenuated state in which the optical-coupling efficiency is high. When the optical disk drive 101 receives a read command, the system controller 107 starts up in step st26 as shown in FIG. 8. Next in step st27, the system controller 107 judges whether the output of the split-light amount monitoring light-detecting element 216 is higher than predetermined (reference value Pon). When the system controller 107 has determined the output to be higher than predetermined (reference value Pon), it goes to step st28. If the system controller 107 has determined the output to be lower than predetermined (reference value Pon), it will stay in step st27. In step st28, it will judge whether the time for which the variation of the output of the split-light amount monitoring light-detecting element 216 has been smaller than predetermined is longer than predetermined. When the system controller 107 has determined the time to be longer than predetermined, it goes to step st29. If the system controller 107 has determined the time not to be longer than predetermined, it will stay in step st28. In step st29, the system controller 107 has the optical disk drive 101 start a reading operation. When the optical disk drive 101 should exit the reading operation, the system controller 107 goes to step st30 where it will have the optical disk drive 101 exit the reading operation, and go back to the standby mode. In step st31, the system controller 107 exits the operation. When the optical disk drive 101 is in the standby mode, the light source is ready for emission of a laser beam having a reading power and the voltage applied to the liquid crystal element is for a lower optical-coupling efficiency.

In the standby mode, the optical disk drive 101 always holds a light-attenuated state in which the optical-coupling efficiency is high, and selects, only upon reception of a read command, another light-attenuated state in which the optical-coupling efficiency is low. The operations made in the optical disk drive 101 will be described with reference to FIGS. 9 and 10.

When the optical disk drive 101 is in the standby mode, the system controller 107 controls the optical disk drive 101 hold a light-attenuated state in which the optical-coupling efficiency is high and select, only upon reception of a read command, another light-attenuated state in which the optical-coupling efficiency is low. Upon reception of a write command, the system controller 107 starts up in step st32 as shown in FIG. 9. Next in step st33, the system controller 107 judges whether the output of the split-light amount monitoring light-detecting element 216 is lower than predetermined (reference value Poff). When the system controller 107 has determined the output to be lower than predetermined (reference value Poff), it goes to step st34. If the system controller 107 has determined the output not to be lower than predetermined (reference value Poff), it will stay in step st33. In step st34, it will judge whether the time for which the variation of the output of the split-light amount monitoring light-detecting element 216 has been smaller than predetermined is longer than predetermined. When the system controller 107 has determined the time to be longer than predetermined, it goes to step st35. If the system controller 107 has determined the time not to be longer than predetermined, it will stay in step st34. In step st35, the system controller 107 has the optical disk drive 101 start a writing operation. When the optical disk drive 101 should exit the writing operation, the system controller 107 goes to step st36 where it will have the optical disk drive 101 exit the writing operation, restore the light beam output power to the reading power and go back to the standby mode. In step st37, the system controller 107 exits the operation. It should be noted that when the optical disk drive 101 is in the standby mode, the light source is read for emission of a laser beam having a reading power and the voltage applied to the liquid crystal element is for a higher optical-coupling efficiency.

Next, when the optical disk drive 101 is in the standby mode, the system controller 107 controls the optical disk drive 101 to always hold a light-attenuated state in which the optical-coupling efficiency is high, and select, only upon reception of a read command, another light-attenuated state in which the optical-coupling efficiency is low. Upon reception of a read command, the system controller 107 starts up in step st38 as shown in FIG. 10. Next in step st39, the system controller 107 controls the voltage applied to the liquid crystal element to a voltage for a lower optical-coupling efficiency (voltage corresponding to "Close") and goes to step st40. In step st40, the system controller 107 judges whether the output of the split-light amount monitoring light-detecting element 216 is higher than predetermined (reference value Pon). When the system controller 107 has determined the output to be higher than predetermined (reference value Pon), it goes to step st41. If the system controller 107 has determined the output not to be higher than predetermined (reference value Pon), it will stay in step st40. In step st41, it will judge whether the time for which the variation of the output of the split-light amount monitoring light-detecting element 216 has been smaller than predetermined is longer than predetermined. When the system controller 107 has determined the time to be longer than predetermined, it goes to step st42. If the system controller 107 has determined the time not to be longer than predetermined, it will stay in step st41. In step st42, the system controller 107 has the optical disk drive 101 start a reading operation. When the optical disk drive 101 should exit the reading operation, the system controller 107 goes to step st43 where it will have the optical disk drive 101 exit the reading operation, and then goes to step S44. In step st44, the system controller 107 controls the voltage applied to the liquid crystal element to a voltage for a higher optical-coupling efficiency (voltage corresponding to "Open") and goes to step st45. In step st45, the system controller 107 have the optical disk drive 101 go back to the standby mode. In step st46, it exits the operation.

Figure 11:
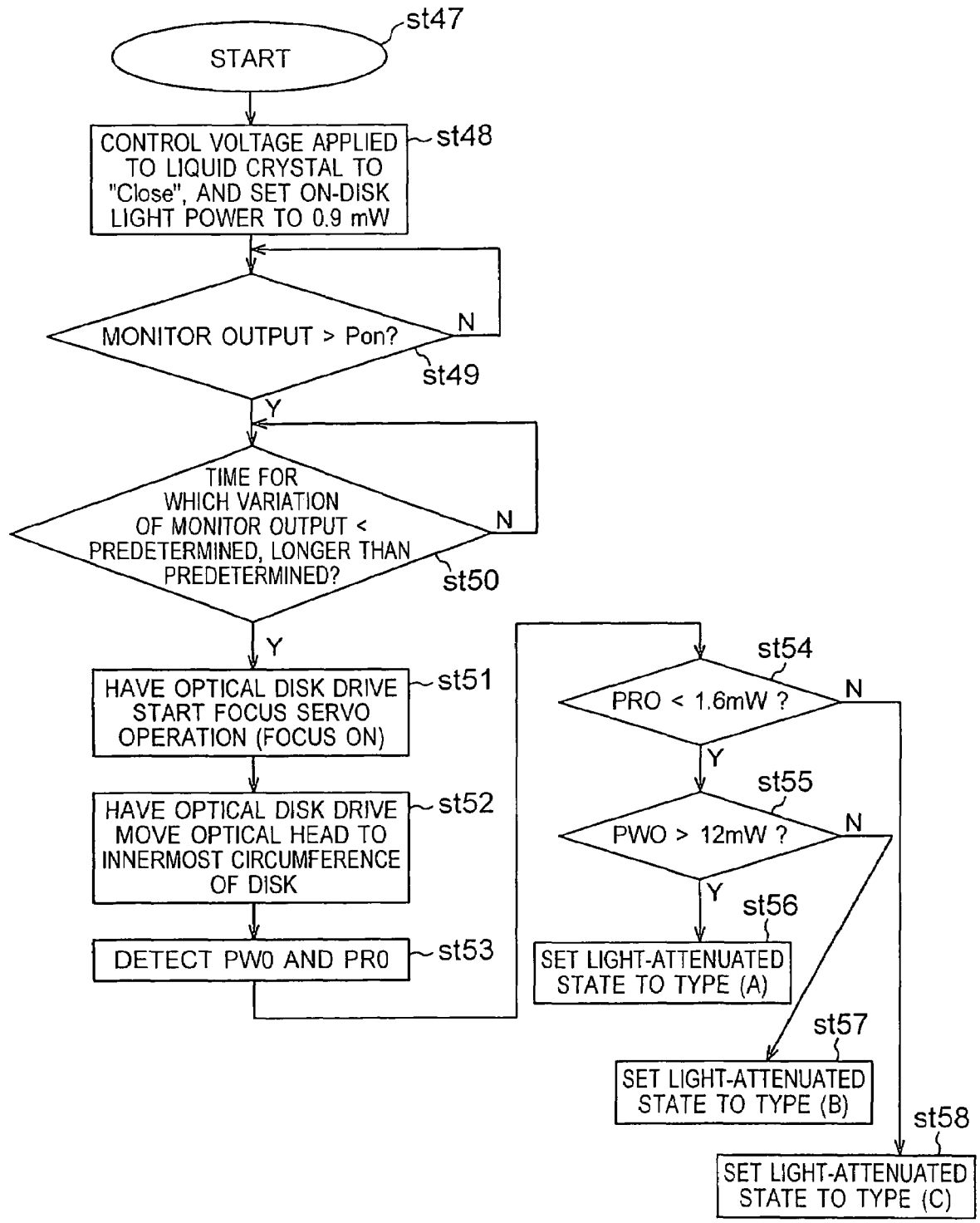
FIG. 11 shows a flow of operations made in the optical disk drive which selects a light-attenuated state corresponding to any of multiple types of optical recording media.

Also, to write or read information signals to or from any of multiple types of optical disks different in specification from each other, the system controller 107 starts up in step st47 as shown in FIG. 11. Next in step st48, the system controller 107 controls the voltage applied to the liquid crystal element to set, as a voltage for a lower optical-coupling efficiency (voltage corresponding to "Close"), the optical output power of the light beam focused on the recording surface of the optical disk (on-disk power) to a predetermined value, for example, 0.9 mW, and then goes to step st49. In step st49, the system controller 107 judges whether the output of the split-light amount monitoring light-detecting element 216 is higher than predetermined (reference value Pon (corresponding to 0.9 mW)). It should be noted that since the output of the split-light amount monitoring light-detecting element 216 varies correspondingly to a setting of the on-disk power, so the value of the setting (reference value Pon) has to be appropriately set correspondingly. When the system controller 107 has determined the of the split-light amount monitoring light-detecting element 216 to be higher than predetermined (reference value Pon), it goes to step st50. If the system controller 107 has determined the output not to be higher than Pon, it will stay in step st49. In step st50, the system controller 107 judges whether the time for which the variation of the output of the split-light amount monitoring light-detecting element 216 has been smaller than predetermined is longer than predetermined. When the system controller 107 has determined the time to be longer than predetermined, it goes to step st51. If the system controller 107 has determined the time not to be longer than predetermined, it will stay in step st50. In step st51, the system controller 107 has the optical head start a focus servo operation (focus ON) and goes to step st52. In step st52, the system controller 107 moves the optical head to the innermost circumference of the optical disk, and goes to step st53. In step st53, the system controller 107 detects a recommended writing power PW0 and recommended reading power PR0, and goes to step st54.

In step st54, the system controller 107 judges whether the recommended reading power PR0 is smaller than predetermined, for example, 1.6 mW. When the system controller 107 has determined the recommended reading power PR0 to be smaller than predetermined, it goes to step st55. If the system controller 107 has determined the recommended reading power PR0 not to be smaller than predetermined, it goes to step st58. In step ste55, the system controller 107 judges whether the recommended writing power PW0 is larger than predetermined, for example, 12 mW. When the system controller 107 has determined the recommended writing power PW0 to be larger than predetermined, it goes to step st56. If the system controller 107 has determined the recommended writing power PW0 not to be larger than predetermined, it goes to step st57.

In step st56, the system controller 107 determines the light-attenuated state to be (A) as shown in FIG. 3, and controls the voltage applied to the liquid crystal element according to the result of determination. In step st57, the system controller 107 determines the light-attenuated state to be (B) as in FIG. 3, and controls the voltage for application according to the result of determination. In step st58, the system controller 107 determines the light-attenuated state to be (C) (=C1 or C2) as in FIG. 3, and controls the voltage for application according to the result of determination.

Figure 12:
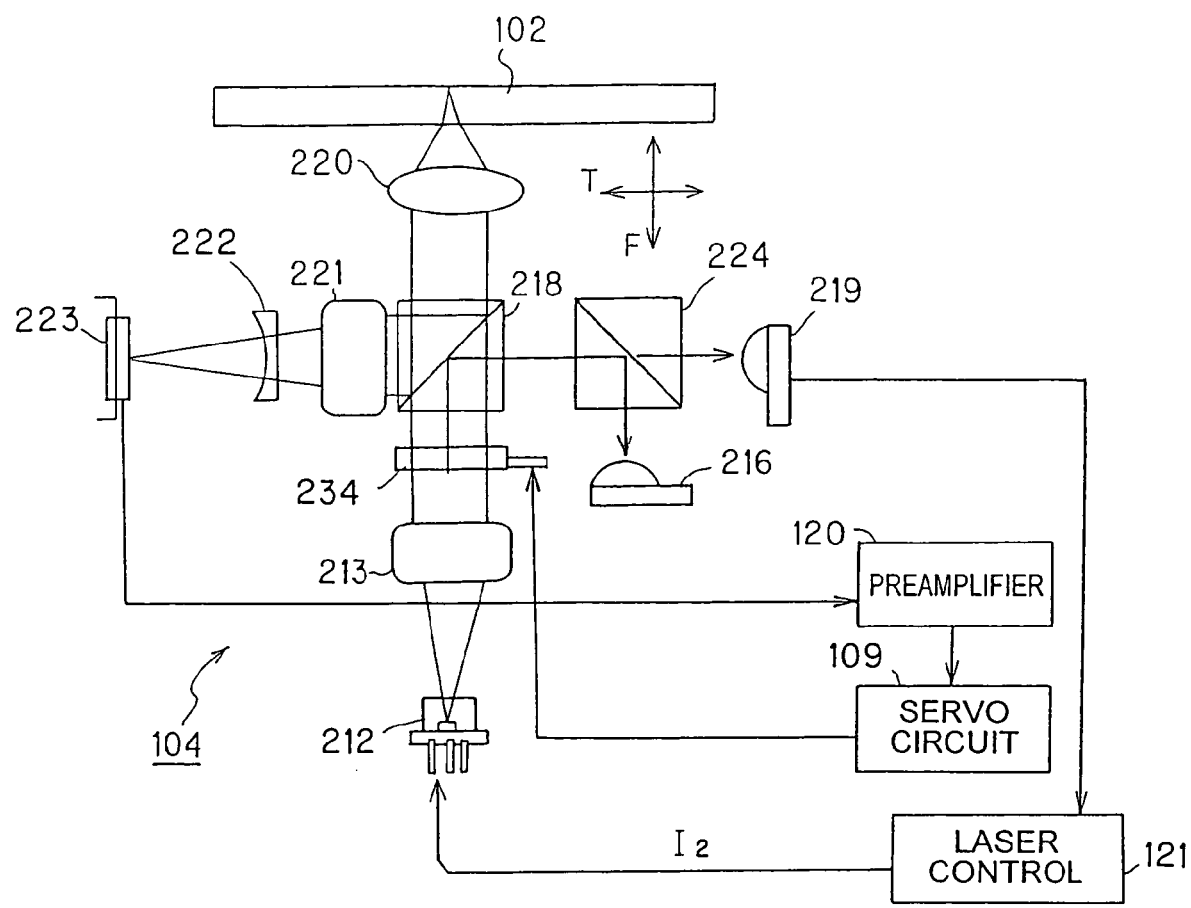
FIG. 12 is a side elevation of another embodiment of the optical head used in the optical disk drive according to the present invention.

In the optical head 104 according to the present invention, the optical-coupling efficiency varying means may be formed from optical elements provided on the light path between the light source and a beam-splitting means, and the beam-splitting means, as shown in FIG. 12.

As shown in FIG. 12, the optical head 104 includes the semiconductor laser element 212, collimator lens 213, liquid crystal element (of a variable polarized state type) 234, and first beam splitter 218, second beam splitter 224, FAPC (front auto power control) detection element 219, objective lens 220, detection lens 221, a multi-component lens 222 and light-detecting element 223. The optical head 104 is formed from these optical parts mounted separately.

The semiconductor laser element 212 is supplied with a drive current $I_2$ from the laser controller 121 of the optical head 104. The voltage applied to the liquid crystal element 214 is controlled by the servo circuit 109. It should be noted that the laser controller 121 may be provided outside the optical head 104 or mounted in the latter.

In the optical head 104 shown in FIG. 12, the laser beam emitted from the semiconductor laser element 212 is incident upon the collimator lens 221 where it will be parallelized, and this parallel beams is incident upon the liquid crystal element 234.

The liquid crystal element 234 varies in polarized state depending upon the applied voltage. The light beam passing by the liquid crystal element 234, having been varied in polarized state, is incident upon the first beam splitter 218.

The first beam splitter 218 allows about 100% of the P-polarized light to pass by and reflects about 100% of the S-polarized light. When the phase difference imparted by the liquid crystal element 234 is just N wavelengths (N is an integer), about 100% of the light beam passes by the first beam splitter 218.

On the other hand, when the phase difference imparted by the liquid crystal element 234 is a half wavelength short of the N wavelengths, the light beam has the polarized direction thereof rotated 45 deg. from a direction in which it is normally polarized so that about 50% thereof will pass by the first beam splitter 218 while the rest (about 50%) is reflected.

The light beam reflected by the first beam splitter 218 is incident upon the second beam splitter 224. The light reflected by the second beam splitter 224 is detected by the split-light amount monitoring light-detecting element 216. The output of the split-light amount monitoring light-detecting element 216 corresponds to a product of the output power from the semiconductor laser element 212 and light-split rate in the first beam splitter 218, and hence it generally corresponds to the optical-coupling efficiency in the optical head 104. It should be noted that as the optical-coupling efficiency is higher, the amount of light incident upon the split-light amount monitoring light-detecting element 216 becomes smaller, while the amount of light incident upon the split-light amount monitoring light-detecting element 216 is larger as the optical-coupling efficiency is lower. The amount of light incident upon the split-light amount monitoring light-detecting element 216 is proportional to 100%−[transmittance in the optical-coupling efficiency varying means (%)]. The output of the split-light amount monitoring light-detecting element 216 is supplied to the preamplifier 120.

The light beam passing by the second beam splitter 224 is incident upon the FAPC light-detecting element 219 that monitors the amount of the light beam going to the signal recording surface of the optical disk 102. The output of the FAPC detection element 219 is sent to the laser controller 121 which will thus perform an operation for the front auto power control (FAPC). More specifically, the laser controller 121 controls the optical output power of the semiconductor laser element 212 so that the output of the FAPC detection element 219 will have a predetermined value. With this control, the incident light beam output on the surface of the optical disk 102 will be constant. It should be noted that the incident light beam output upon the recording surface of the optical disk 102, controlled to the predetermined value, is different from the write to read mode as having previously been described and also from one type to another of optical disk. It should also be noted that in the optical head 104 used in the optical disk drive 101 adopting the light intensity modulation, the light beam is a pulsed laser light.

The light beam emitted from the semiconductor laser element 212, split by the first beam splitter 218 and passing by the latter is incident upon the objective lens 220. The objective lens 220 focuses the light beam coming to the optical disk 102 onto a point on the recording surface of the optical disk 102. The objective lens 220 is moved in a focusing direction indicated with an arrow F in FIG. 12, parallel to the optical axis of the objective lens 220, and in a tracking direction indicated with an arrow T also in FIG. 12, perpendicular to the optical axis of the objective lens 220, respectively, according to focusing and tracking error signals generated on the basis of a return light detected from the optical disk 102.

The return light from the recording surface of the optical disk is incident upon the first beam splitter 218 through the objective lens 220 again. The first beam splitter 218 splits, by reflection, the return light in an amount of light corresponding to the reflectance of the latter.

The detection lens 221 converts the return light split by the first beam splitter 218 into a convergent light beam, the multi-component lens 222 imparts an astigmatism to the convergent light for the purpose of producing a focus error signal by the astigmatism method, and the light-detecting element 223 detects the resultant light beam. A focusing error signal, tracking error signal and RF signal can be produced on the basis of a detection output of the light-detecting element 223.

Figure 13:
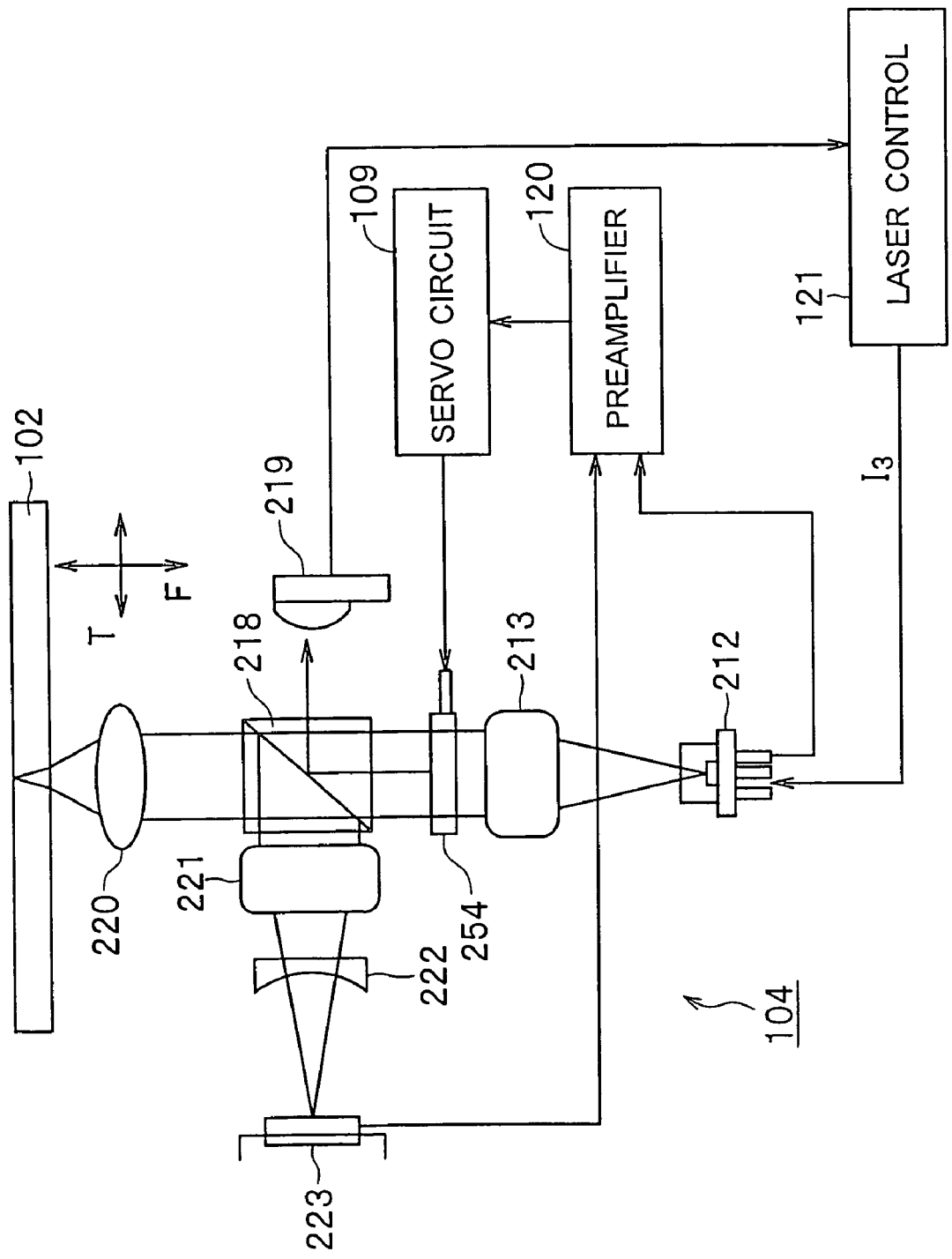
FIG. 13 is a side elevation of a still another embodiment of the optical head used in the optical disk drive according to the present invention.

Note that in the optical head 104 according to the present invention, the optical-coupling efficiency varying means may be formed from optical elements provided on the light path between the light source and a beam-splitting means, and the beam-splitting means, as shown in FIG. 13. The optical head 104 includes the semiconductor laser element 212, collimator lens 213, liquid crystal element (of an independent transmittance-variable type) 254 as the optical-coupling efficiency varying means, and first beam splitter 218, FAPC (front auto power control) detection element 219, objective lens 220, detection lens 221, a multi-component lens 222 and light-detecting element 223. The optical head 104 is formed from these optical parts mounted separately.

The semiconductor laser element 212 is supplied with a drive current $I_3$ from the laser controller 121 of the optical head 104. The voltage applied to the liquid crystal element 214 is controlled by the servo circuit 109. It should be noted that the laser controller 121 may be provided outside the optical head 104 or mounted in the latter.

The output $B_P$ of the rear-monitoring photodetector (not shown) included in the semiconductor laser element 212 is supplied to the preamplifier 120. The voltage applied to the liquid crystal element 254 of the independent transmittance-variable type is controlled by the servo circuit 109.

In the optical head 104 shown in FIG. 13, the laser beam emitted from the semiconductor laser element 212 is incident upon the collimator lens 221 where it will be parallelized, and this parallel beams is incident upon the liquid crystal element 254.

The liquid crystal element 254 varies in polarized state depending upon the applied voltage. The light beam passing by the liquid crystal element 254, having been varied in polarized state, is incident upon the first beam splitter 218.

The first beam splitter 218 allows about 100% of the P-polarized light to pass by and reflects about 100% of the S-polarized light. Since the liquid crystal element 254 imparts no phase difference to the light beam, about 100% of the light beam will pass by the first beam splitter 218.

The small amount of light beam reflected by the first beam splitter 218 is incident upon the FAPC light-detecting element 219 that monitors the amount of the light beam going to the signal recording surface of the optical disk 102. The output of the FAPC detection element 219 is sent to the laser controller 121 which will thus perform an operation for the front auto power control (FAPC). More specifically, the laser controller 121 controls the optical output power of the semiconductor laser element 212 so that the output of the FAPC detection element 219 will have a predetermined value. With this control, the incident light beam output on the surface of the optical disk 102 will be constant. The output of the rear-monitoring photodetector will be proportional to the optical output power of the semiconductor laser element 212.

It should be noted that the incident light beam output upon the recording surface of the optical disk 102, controlled to the predetermined value, is different from the write to read mode as having previously been described and also from one type to another of optical disk. It should also be noted that in the optical head 104 used in the optical disk drive 101 adopting the light intensity modulation, the light beam is a pulsed laser light.

The light beam emitted from the semiconductor laser element 212, passing by the first beam splitter 218, is incident upon the objective lens 220. The objective lens 220 focuses the light beam coming to the optical disk 102 onto a point on the recording surface of the optical disk 102. The objective lens 220 is moved in a focusing direction indicated with an arrow F in FIG. 13, parallel to the optical axis of the objective lens 220, and in a tracking direction indicated with an arrow T also in FIG. 13, perpendicular to the optical axis of the objective lens 220, respectively, according to focusing and tracking error signals generated on the basis of a return light detected from the optical disk 102.

The return light from the recording surface of the optical disk is incident upon the first beam splitter 218 through the objective lens 220 again. The first beam splitter 218 splits, by reflection, the return light in an amount of light corresponding to the reflectance of the latter.

The detection lens 221 converts the return light split by the first beam splitter 218 into a convergent light beam, the multi-component lens 222 imparts an astigmatism to the convergent light for the purpose of producing a focus error signal by the astigmatism method, and the light-detecting element 223 detects the resultant light beam. A focusing error signal, tracking error signal and RF signal can be produced on the basis of a detection output of the light-detecting element 223.

In the optical disk drive using the optical head 104 constructed as shown in FIG. 13, selection between the write and read modes is effected as will be described below with reference to FIGS. 14A to 14D.

Figure 14A:
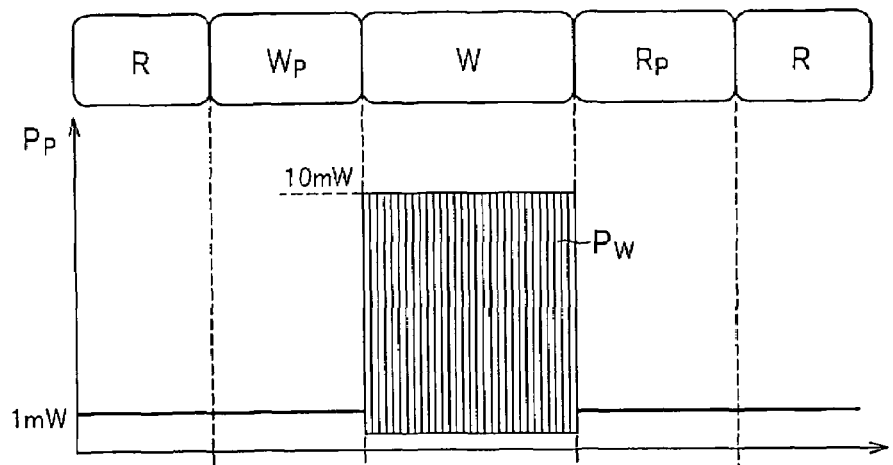
FIGS. 14A to 14D are timing diagrams showing the laser light state which varies when the optical disk drive is switched in mode of operation between write and read.
Figure 14B:
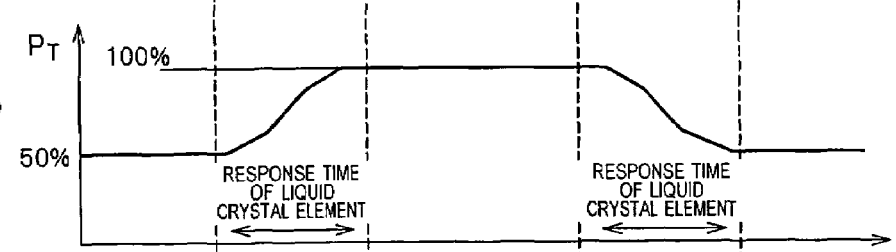
Figure 14C:
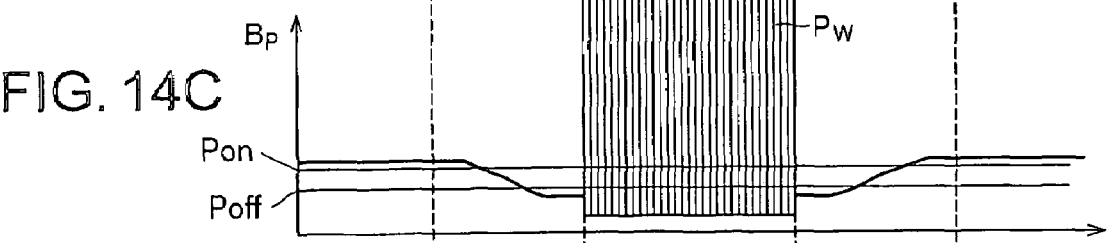
Figure 14D:
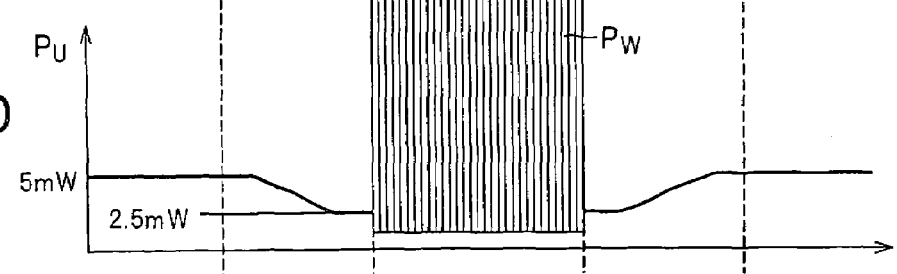

FIGS. 14A to 14D are timing diagrams showing the laser light state which varies when the optical disk drive 101 is switched in mode of operation between write W and read R. FIG. 14A shows an amount of light focused on the signal recording surface of the optical disk 102, that is, an on-disk light power $P_P$, FIG. 14B shows a transmittance $P_T$ of the laser beam in the optical-coupling efficiency varying element, FIG. 14C shows the level of output $B_P$ of the rear monitor, and FIG. 14D shows a variation of the laser output power $P_U$.

Also the optical disk drive using the optical head 104 according to this embodiment can be controlled similarly to the optical disk drive 101 using the optical head 104 constructed as shown in FIG. 2 by setting reference levels of the reference values Pon and Poff for the rear-monitor output $B_P$ as shown in FIG. 14C.

In the optical disk drive 101 using the optical head 104 shown in FIG. 13, the laser controller 121 makes a selection between the write mode W and read mode R with precise timing according to a command from the system controller 107 after the liquid crystal element 214 starts to respond as will be described below.

More specifically, in the read mode R, the voltage applied to the liquid crystal element 254 is adjusted by the servo circuit 109 for the transmittance $P_T$ to be 50% as shown in FIG. 14B. At this time, the laser output power $P_U$ is 5 mW as shown in FIG. 14D, and the reading characteristic is good with less laser noise.

When the optical disk drive 101 is switched in mode of operation from read R to write W, first the servo circuit 109 varies the voltage applied to the liquid crystal element 254 according to the command from the system controller 107 to change the transmittance $P_T$ in the liquid crystal element 254 as shown in FIG. 14B.

During a period $W_P$ of write preparation, of the response time of the liquid crystal element 254, the transmittance $P_T$ in the liquid crystal element 254 is varied from 50% to 100% as shown in FIG. 14B, and the laser output power $P_U$ is varied from 5 mW to 2.5 mW as shown in FIG. 14D under the effect of the auto power control operation. At this time, the rear-monitor output $B_P$ is also lowered correspondingly to the variation of the transmittance $P_T$ of the liquid crystal element 254 and variation of the laser output power $P_U$, as shown in FIG. 14C. Since the liquid crystal element is limited in response speed, the optical power of light focused on the signal recording surface of the optical disk 102 is held as a reading optical power as shown in FIG. 4A during a write preparation $W_P$, which is a transition of the response. The rear-monitor output $B_P$ is supplied to the servo circuit 109 via the preamplifier 120. When the output $B_P$ is lower than a preset output level reference value Poff, it is determined that the transmittance $P_T$ in the liquid crystal element 254 has become nearly 100%, and the laser controller 121 generates a signal write pulse $P_W$ according to a command supplied from the signal modem/ECC block 108 via the system controller 107. Thus the laser output power $P_U$ is modulated, and information signals will be written to the optical disk 102.

The optical disk drive 101 is switched from the write mode W to read mode R as will be described below.

For changeover from the write mode W to read mode R, the laser controller 121 first switches the mode of operation from write W to read R according to a command from the system controller 107. In this condition, namely, in the initial state of the read preparation $R_P$, since the laser output power $P_U$ is as low as 2.5 mW as shown in FIG. 14D, the laser noise is high.

After the laser output power is changed to a reading optical power, the servo circuit 109 varies the voltage applied to the liquid crystal element 254 according to a command from the system controller 107 to change the transmittance in the liquid crystal element 254.

During a period of read preparation $R_P$, of the response time of the liquid crystal element 254, the transmittance $P_T$ in the liquid crystal element 254 is varied from 100% to 50% as shown in FIG. 14B, the laser output power $P_U$ is varied from 2.5 mW to 5 mW under the effect of the auto power control operation, and thus a quality read signal can be detected with a suppression of laser noise, as shown in FIG. 14D. At this time, when the rear-monitor output $B_P$ exceeds a preset reference value Pon as shown in FIG. 14C, it is determined that the transmittance $P_T$ in the liquid crystal element 254 has been reduced to a sufficient extent, and signal read is started in the read mode R for reading information signals from the optical disk 102. In some cases, upon switching to the read mode R, the signal read may be started, and mode switching may be repeatedly done if a laser noise causes an error in the read signal. At this time, the rear-monitor output $B_P$ is also elevated correspondingly to the variation of the transmittance $P_T$ in the liquid crystal element 254 and variation of the laser output power $P_U$ as shown in FIG. 14B.

If the switching between the write and read modes W and R has not been effected as above, the following trouble will take place:

First, in case the optical disk drive 101 is switched in mode of operation from read R to write W, the writing operation will start with the optical output power being still high, that is, with the optical-coupling efficiency being still small. So, if the semiconductor laser element is operated to provide an optical output exceeding the maximum rating of optical output power of the semiconductor laser element, the latter will possibly be damaged.

In case the mode of operation is switched from write W to read R, the reading operation will start with the optical output power being still low, that is, with the optical-coupling efficiency being still large. So, no good reading characteristic will be assured because of much laser noise. Also, if the optical-coupling efficiency is first reduced after completion of a writing operation, the semiconductor laser element will possibly be damaged as the case may be if it is operated to provide an optical output power exceeding the maximum rating of optical output power.

On this account, by switching the mode of operation between write W and read R following the above procedure, it is possible to sufficiently suppress the laser noise when reading information signals even with a small ratio between the writing and reading optical output powers of light beams. Using a light source whose maximum rating of optical output power is small, the optical disk drive can write and read information signals accurately.

Note that in each of the aforementioned optical heads, the optical-coupling efficiency varying means may use a wave plate type liquid crystal element as the liquid crystal element or may be of any other type.

The optical-coupling efficiency varying means will be described in detail below concerning some types thereof.

The first type of the optical-coupling efficiency varying element used in the optical head according to the present invention uses a means capable of varying the transmittance or reflectance of a light beam. That is, the means changes the optical-coupling efficiency by varying the transmittance or reflectance of a light beam.

The second type of the optical-coupling efficiency varying element uses a light-path branching means that splits a light beam into at least two beams and makes them beams travel along different light paths. Namely, the light-path branching means varies the optical-coupling efficiency by varying the ratio of beam splitting between the two light paths.

Each of the above types of the optical-coupling efficiency varying elements will be described in detail below.

FIGS. 15A and 15B are perspective views of an illustrative example of the first type of the optical-coupling efficiency varying element. This optical-coupling efficiency varying element uses a transmission type liquid crystal element 21 capable of varying the transmittance of a light beam. With changing of a voltage applied to the liquid crystal element 21, the latter varies the transmittance of a light beam $L_1$. More specifically, with a drive voltage applied to the liquid crystal element 21 being changed, the orientation of the liquid crystal is varied to change the light transmittance level from high as in FIG. 15A to low as in FIG. 15B. The liquid crystal element 21 is driven under the control of a liquid crystal drive circuit provided in the servo circuit 109.

FIGS. 16A and 16B are perspective views of another illustrative example of the first type of the optical-coupling efficiency varying element. This optical-coupling efficiency varying element uses a filter plate 22 capable of varying the transmittance of a light beam. The filter plate 22 has a transparent plate 22a slidable in the direction of arrow S in FIGS. 16A and 16B and a translucent filter 22b, for example, provided in a part of the transparent plate 22a.

The filter plate 22 shown in FIGS. 16A and 16B displaces the filter 22b in the direction of arrow S in FIG. 16 on the light path along which the light beam $L_1$ travels to select either a state in which the light beam $L_1$ passes by a part of the transparent plate 22a as shown in FIG. 16A and a state in which the light beam $L_1$ passes by the filter 22b as shown in FIG. 16B, and varies the transmittance of the light beam $L_1$.

More specifically, it is possible to reduce the passing light beam and hence the optical-coupling efficiency by positioning the filter 22b on the light path of the light beam $L_1$ as shown in FIG. 16B. Also, it is possible to allow all the light beam $L_1$ to pass by to increase the amount of passing light and hence elevate the optical-coupling efficiency by positioning the transparent plate 22a on the light path of the light beam $L_1$ as shown in FIG. 16A.

The filter plate 22 is supported on a piezoelectric element or the like, for example, and the piezoelectric element is controlled by a drive circuit included in the servo circuit 109 to control the position of the filter plate 22. Alternatively, the filter plate 22 may be supported by a mechanism including a screw and motor, and the filter plate 22 be positioned under the control of a drive circuit included in the servo circuit 109.

The aforementioned optical-coupling efficiency varying element is configured to change the transmittance of a light beam, but it may be configured with a reflective element provided on the light path of the light beam $L_1$ to change the reflectance of the light beam $L_1$.

Figure 17A:
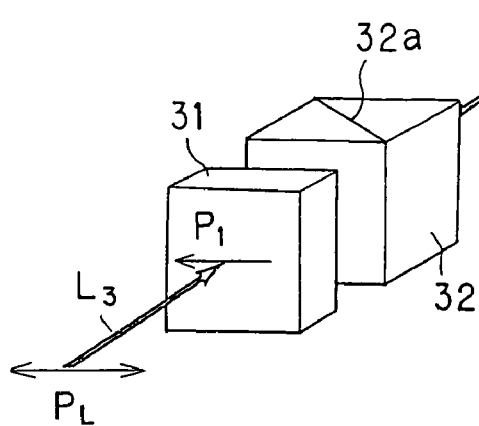
FIGS. 17A to 17C are perspective views of an illustrative example of a second type of the optical-coupling efficiency varying element used in the optical head used in the optical disk drive according to the present invention.
Figure 17B:
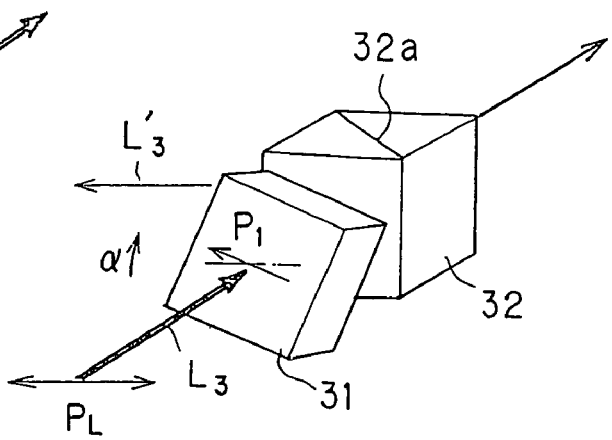

FIGS. 17A and 17B are perspective views of an illustrative example of a second type of the optical-coupling efficiency varying element. As shown, this optical-coupling efficiency varying element uses a wave plate 31 and beam splitter 32, provided to branch the light path of the light beam $L_1$. When the wave plate 31 is turned circumferentially of the light path of the light beam $L_1$, the latter is split into light beams, and the light beams are made to travel along different light paths, by a beam-splitting membrane 32a included in the beam splitter 32.

As shown in FIG. 37A, when the optical-axial direction $P_L$ of the wave plate 31 is aligned with the polarized direction $P_1$ of incident light $L_3$, the latter is not reflected by the beam splitter 32, but wholly passes by the beam splitter 32.

On the other hand, when the optical-axial direction $P_1$ of the wave plate 31 is turned a fixed angle α from the polarized direction $P_L$ of the incident light $L_3$ as shown in FIG. 17B, the beam splitter 32 reflects a part $L_3'$ of the incident light $L_3$ and allows only the remainder $LL_3$ of the incident light $L_3$ to pass by in the direction of the optical disk.

For example, in case the beam-splitter membrane is a PS (perfect-splitting) membrane ($T_P$=100%, $R_S$=100%) and the wave plate 31 is a half-wave plate, the rotation angle α and transmittance ratio T have the following relation between them.

Figure 17C:
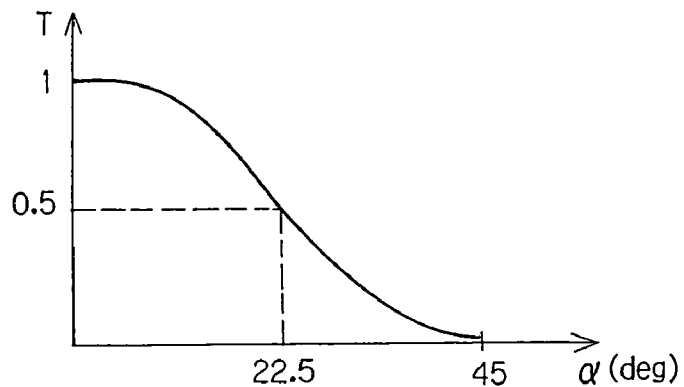

First, the polarized direction is turned 2α with a rotation angle α. At this time, the ratio of P-polarized light incident upon the beam splitter 32, that is, the transmittance ratio T, is given as follows as shown in FIG. 17C.

$$T = \cos^2 2\alpha = (1+\cos 4\alpha)/2$$

Therefore, for an optical-coupling efficiency of 100 to 50%, the polarized direction should be turned between angles of α=0 deg. and α=22.5 deg. Thus, the polarized direction varies 45 deg, and the transmittance ratio can be controlled to 100% or 50%.

Figure 18A:
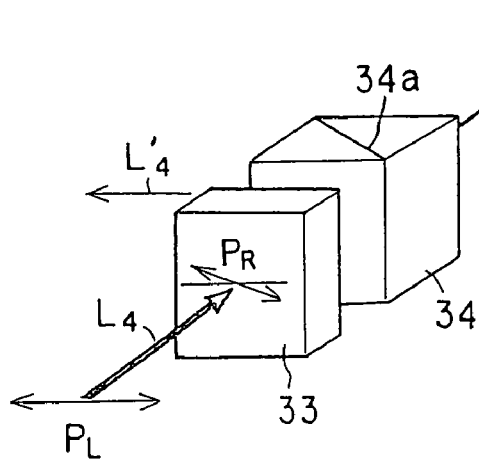
FIGS. 18A and 18B are perspective views of another illustrative example of the second type of the optical-coupling efficiency varying element used in the optical head used in the optical disk drive according to the present invention.
Figure 18B:
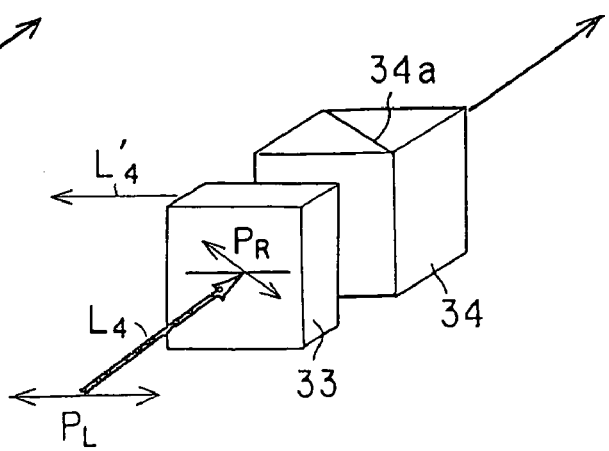

FIGS. 18A and 18B are perspective views of another illustrative example of the second type of the optical-coupling efficiency varying element. This optical-coupling efficiency varying element includes a liquid crystal element 33 and beam splitter 34, provided to split the light beam $L_1$ into light beams and make the light beams travel along different light paths. When the liquid crystal element 33 works as a wave plate, and the beam splitter 34 splits a light beam by a beam-splitting membrane 34a included in the beam splitter 34.

More specifically, the liquid crystal element 33 used in this optical-coupling efficiency varying element has a rubbing direction $P_R$ set to 22.5 deg. as shown in FIG. 18A. By changing the phase difference of the liquid crystal element 33 to Nλ to (N+0.5)λ or Nλ to (N−0.5)λ (where N is an integer and λ is a wavelength), the polarized direction of a light beam $L_4$ incident upon the beam splitter 34 can be changed 45 deg. and the transmittance ratio be changed within a range of 100% to 50%.

Also, the liquid crystal element 33 used in the optical-coupling efficiency varying element has a rubbing direction $P_R$ set to 45 deg. as shown in FIG. 18B. By changing the phase difference of the liquid crystal element 33 to Nλ to (N+0.25)λ or Nλ to (N−0.25)λ (where N is an integer and λ is a wavelength), the polarized direction of a light beam $LP_R$ incident upon the beam splitter 34 can be changed from a P-polarized light to a circularly polarized light and the transmittance ratio be changed within a range of 100% to 50%.

Now, the liquid crystal element develops a phase difference on the basis of the principle which will be described below:

FIGS. 19A and 19B are sectional views of the liquid crystal elements, FIG. 19C explains a variation in refractive index of the liquid crystal element when applied with a voltage, and FIG. 19D shows a variation of the phase difference in relation to a voltage applied to the liquid crystal element.

As shown in FIGS. 19A and 19B, a liquid crystal element, generally indicated with a reference 40, includes two glass substrates 41 and 42, liquid crystal molecules 49 sealed between the glass substrates 41 and 42 and oriented by orientation membranes 43 and 44 provided on the inner surfaces of the glass substrates 41 and 42, respectively, transparent electrode membranes 45 and 46 provided between the glass substrate 41 and orientation membranes 43 and between the glass substrate 42 and orientation membrane 44, respectively. By varying the voltage applied between the transparent electrode membranes 45 and 46, the liquid crystal molecules 49 are changed from a state in which they are disposed along a rubbing direction indicated with an arrow A in FIG. 19A, parallel to the orientation membranes 43 and 44, as shown in FIG. 19A to a state in which they are erected vertically in relation to the orientation membranes 43 and 44 as shown in FIG. 19B.

It is assumed here that the refractive index in a direction along the rubbing direction when the liquid crystal molecules 49 are parallel to the orientation membranes 43 and 44 is N1 and the refractive index in a direction along the rubbing direction when the liquid crystal molecules 49 are perpendicular to the rubbing direction is N2. The refractive index N1 in the direction along the rubbing direction changes as shown in FIG. 19C correspondingly to displacement of the liquid crystal molecules 49, caused by a variation of the applied voltage. It should be noted that the refractive index N2 in the direction perpendicular to the rubbing direction remains constant.

As a result, a phase difference developed in an incident light L5 traveling in the direction along the rubbing direction is varied as shown in FIG. 19D.

The above principle permits to use the liquid crystal element as a wave plate. By combining the liquid crystal element with a beam splitter, a light-path branching means can be implemented.

Note that the examples of the optical-coupling efficiency varying element in FIGS. 18A and 18B are just typical illustrative ones and hence the ranges of the rubbing direction and phase difference can be set variably correspondingly to a necessary variation of the transmittance ratio.

The liquid crystal element is not limited to any one which can serve as a wave plate but may be formed from a liquid crystal which would be able to vary the polarized light incident upon the beam splitter, such as a twisted-nematic type liquid crystal used in a liquid crystal display.

Figure 20A:
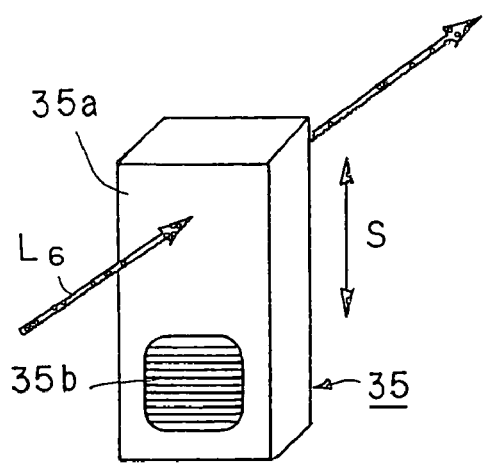
FIGS. 20A and 20B are perspective views of a still another illustrative example of the second type of optical-coupling efficiency varying element in the optical head used in the optical disk drive according to the present invention.
Figure 20B:
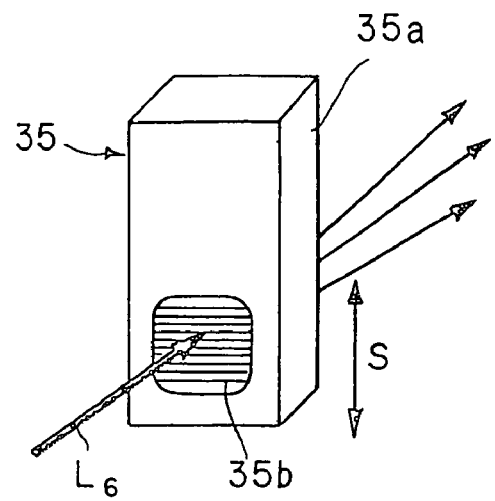

FIGS. 20A and 20B are perspective views of a still another illustrative example of the second type of optical-coupling efficiency varying element. This optical-coupling efficiency varying element uses a diffraction grating plate 35 as a light-path branching means.

The diffraction grating plate 35 has a transparent plate 35a slidable in the direction of arrow S in FIGS. 20A and 20B and a diffraction grating 35b provided in a part of the transparent plate 35a.

The diffraction grating plate 35 shown in FIGS. 20A and 20B displaces the diffraction grating 35b in the direction of arrow S in FIG. 20A on the light path along which the light beam $L_6$ travels to select either a state in which the light beam $L_6$ passes by a part of the transparent plate 35a as shown in FIG. 20A and a state in which the light beam $L_6$ passes by the diffraction grating 35b as shown in FIG. 20B, and varies the split state of the light beam $L_6$.

More specifically, it is possible to reduce the optical-coupling efficiency by positioning the diffraction grating 35b on the light path of the light beam $L_6$ as shown in FIG. 20B to split the laser beam $L_6$.

Also, it is possible to increase the optical-coupling efficiency by positioning a part, except for the diffraction grating 35b, of the transparent plate 35a on the light path of the laser light $L_6$ as shown in FIG. 20A to allow the light beam $L_6$ to pass by without splitting it.

The diffraction grating plate 35 is supported on a piezoelectric element or the like, for example, and the piezoelectric element is controlled by a drive circuit included in the servo circuit 109 to control the position of the diffraction grating plate 35. Alternatively, the diffraction grating plate 35 may be supported by a mechanism including a screw and motor, and the diffraction grating plate 35 be positioned under the control of a drive circuit included in the servo circuit 109.

The ratio of light amount diffracted by the diffraction grating 35b is set as follows:

First-order light:Zero-order light:Negative first-order light

=25%:50%:25%

Note that positive/negative second-order light and higher-order diffracted light are not taken in consideration herein for the convenience of illustration and explanation.

In this case, it is possible to vary the light beam used to write or read information signals to or from the optical disk within a range of 100 to 50%. In this case, the positive/negative first-order light can be used for other purposes of cross-talking canceling etc.

Figure 21A:
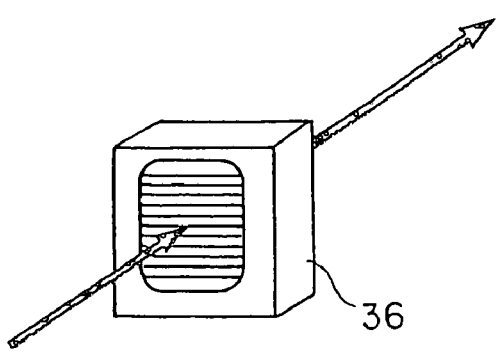
FIGS. 21A and 21B are perspective views of a yet another illustrative example of the second type of optical-coupling efficiency varying element in the optical head used in the optical disk drive according to the present invention.
Figure 21B:
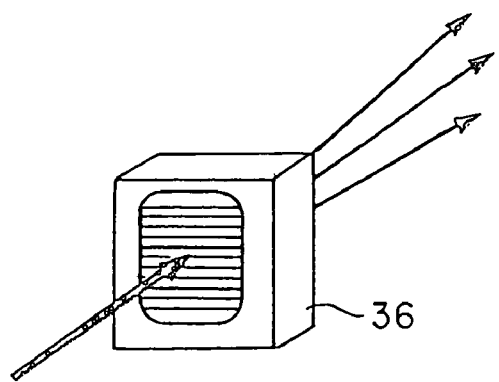

FIGS. 21A and 21B are perspective views of a yet another illustrative example of the second type of optical-coupling efficiency varying element. This optical-coupling efficiency varying element uses a liquid crystal element 36 capable of changing the phase difference in the form of a diffraction grating to branch a light beam $L_7$.

The liquid crystal element 36 is configured as follows. Namely, each of the transparent electrodes shown in FIGS. 19A and 19B is divided into a plurality of electrodes and the resultant divisional electrodes are applied with different voltages, respectively, or a part of the glass substrate also shown in FIGS. 19A and 19B is formed slanted to provide a variation in thickness of the liquid crystal layer, to thereby form grating-like regions different in phase difference from each other. Thus, a diffraction grating variable in phase depth is implemented.

In the liquid crystal element 36, the ratio of diffracted light amount varies from one phase depth (difference in phase difference) to another. So, it can be used as follows:

For writing information signals to the optical disk, the ratio of diffracted light amount is set as follows:

First-order light:Zero-order light:Negative first-order light

=5%:90%:5%

For reading information signals from the optical disk, the ratio of diffracted light amount is set as follows:

First-order light:Zero-order light:Negative first-order light

=25%:50%:25%

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, even with a small power ratio of the light source between the write and read modes, the laser noise in the read mode can be suppressed to a sufficiently low level. Using a light source whose maximum rating of optical output power is relatively small, it is possible to assure accurate write and read of information signals.

According to the present invention, the optical-coupling efficiency varying means can be controlled correspondingly to the type of an optical recording medium, discriminated by the medium type discriminating means, to the recording surface of the optical recording medium, discriminated by the recording surface discriminating means or to the recording area of the optical recording medium, discriminated by the recording area discriminating means, to optimize the write and/or read light pulse on the recording surface of the optical recording medium.

The invention claimed is:

1. An optical head comprising:
   a light source;
   a light focusing means for focusing a light beams emitted from the light source onto an optical recording medium;
   a beam splitting means for making the light beam emitted from the light source and return light coming from the optical recording medium via the light focusing means travel along different light paths;
   a light detecting means for detecting the return light coming from the optical recording medium via the beams splitting means; and
   an optical-coupling efficiency varying means provided between the light source and the beam splitting means, the optical-coupling efficiency varying means adapted to vary an optical-coupling efficiency that is a ratio of an amount of light focused on the optical recording medium with a total amount of light emitted from the light source;
   an optical-coupling efficiency detecting means for detecting an optical-coupling efficiency varied by the optical-coupling efficiency varying means,
   an irradiation light power detecting means for detecting a part of the power of the light beam for irradiation to the optical recording medium,
   an optical power controlling means for controlling the power of the light beam from the light source on the basis of the power of the light beam detected by the irradiation light power detecting means, power to keep constant the power of the light beam for irradiation to the optical recording medium, and
   in the state that the power of the light beam for irradiation to the optical recording medium by the optical power controlling means is constant, the optical-coupling efficiency detecting means detects optical-coupling efficiency varied when optical-coupling efficiency is changed by the optical-coupling efficiency varying means,
   the optical-coupling efficiency varying means changes the optical-coupling efficiency according to the optical-coupling efficiency varied that the optical-coupling efficiency detecting means detected.

2. The optical head according to claim 1, wherein the optical-coupling efficiency detecting means is a light detecting means for detecting a light beam having been made by the optical-coupling efficiency varying means to travel along a light path branched from a light path extending toward the optical recording medium.

3. An optical recording medium recording and/or playback apparatus which writes or reads information signals to a selected one of at least two or more types of optical recording media different in optimum recording-optical power and/or reading optical power from each other, the apparatus including:

a light source;

a light focusing means for focusing a light beams emitted from the light source onto an optical recording medium;

a beam splitting means for making the light beam emitted from the light source and return light coming from the optical recording medium via the light focusing means travel along different light paths;

a light detecting means for detecting the return light coming from the optical recording medium via the beams splitting means; and an optical-coupling efficiency varying means provided between the light source and the beam splitting means, the optical-coupling efficiency varying means is adapted to vary an optical-coupling efficiency that is a ratio of an amount of light focused on the optical recording medium with a total amount of light emitted from the light source;

an optical-coupling efficiency detecting means for detecting an optical-coupling efficiency varied by the optical-coupling efficiency varying means, an irradiation light power detecting means for detecting a part of the power of the light beam for irradiation to the optical recording medium, an optical power controlling means for controlling the power of the light beam from the light source on the basis of the power of the light beam detected by the irradiation light power detecting means, power to keep constant the power of the light beam for irradiation to the optical recording medium, and in the state that the power of the light beam for irradiation to the optical recording medium by the optical power controlling means is constant, the optical-coupling efficiency detecting means detects optical-coupling efficiency varied when optical-coupling efficiency is changed by the optical-coupling efficiency varying means, the optical-coupling efficiency varying means changes the optical-coupling efficiency according to the optical-coupling efficiency varied that the optical-coupling efficiency detecting means detected.

4. The apparatus according to 3, wherein information signals are written to and/or read from a selected one of at least two or more types of optical recording media different in optimum writing optical power and/or reading optical power from each other.

5. The apparatus according to claim 4, further comprising an optical-coupling efficiency controlling means for controlling, on the basis of detection from the optical-coupling efficiency detecting means, the variation of the optical-coupling efficiency by the optical-coupling efficiency detecting means and the power of the light beam from the light source, the optical-coupling efficiency controlling means controlling the optical-coupling efficiency varying means correspondingly to the type of the optical recording medium used.

* * * * *